United States Patent
Deiss et al.

(10) Patent No.: US 9,936,226 B2
(45) Date of Patent: Apr. 3, 2018

(54) ROBUST DIGITAL CHANNELS

(71) Applicant: THOMSON LICENSING, Issy de Moulineaux (FR)

(72) Inventors: Michael Scott Deiss, Zionsville, IN (US); James Edwin Hailey, Indianapolis, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 80 days.

(21) Appl. No.: 14/708,410

(22) PCT Filed: Dec. 17, 2012

(86) PCT No.: PCT/US2012/070054
§ 371 (c)(1),
(2) Date: May 11, 2015

(87) PCT Pub. No.: WO2014/098789
PCT Pub. Date: Jun. 26, 2014

(65) Prior Publication Data
US 2015/0334421 A1 Nov. 19, 2015

(51) Int. Cl.
*H04N 19/65* (2014.01)
*H04N 19/30* (2014.01)
(Continued)

(52) U.S. Cl.
CPC .............. *H04N 19/65* (2014.11); *H04L 1/007* (2013.01); *H04L 1/0041* (2013.01);
(Continued)

(58) Field of Classification Search
CPC ................... H04N 19/65; H04N 19/30; H04N 21/234327; H04L 1/007
(Continued)

(56) References Cited

U.S. PATENT DOCUMENTS 6,842,714 B1   1/2005   Acar et al.
6,842,724 B1   1/2005   Lou et al.
(Continued)

FOREIGN PATENT DOCUMENTS

EP   1928116       6/2008
WO   WO0035201    6/2000
(Continued)

OTHER PUBLICATIONS

Naghdinezhad et al., "A Novel Adaptive Unequal Error Protection Method for Scalable Video over Wireless Networks," Consumer Electronics, ISCE, Jun. 20-23, 2007, pp. 1-6.
(Continued)

*Primary Examiner* — Hee-Yong Kim
(74) *Attorney, Agent, or Firm* — Tutunjian & Bitetto, P.C.

(57) ABSTRACT

Various implementations provide one or more of improved programming channel change time and/or overall quality of television reception by using multiple transmission channels. In one particular implementation, a first layer of a picture is encoded using a first level of error protection. The encoded first layer has a first decoding delay. A second layer of the picture is encoded using a second level of error protection. The encoded second layer has a second decoding delay. The second level of error protection is lower than the first level of error protection, and the second decoding delay is longer than the first decoding delay. Other implementations provide a signal or signal structure carrying the encoded first and second layers. Yet further implementations decode the encoded first and second layers.

18 Claims, 12 Drawing Sheets

(51) Int. Cl.
| | |
|---|---|
| *H04B 1/66* | (2006.01) |
| *H04B 7/00* | (2006.01) |
| *H04N 19/172* | (2014.01) |
| *H04N 19/503* | (2014.01) |
| *H04N 19/436* | (2014.01) |
| *H04N 21/2343* | (2011.01) |
| *H04N 21/2365* | (2011.01) |
| *H04L 1/00* | (2006.01) |

(52) U.S. Cl.
 CPC ........... *H04L 1/0071* (2013.01); *H04N 19/30* (2014.11); *H04N 21/2365* (2013.01); *H04N 21/234327* (2013.01)

(58) Field of Classification Search
 USPC ..................................................... 375/240.27
 See application file for complete search history.

(56) References Cited

U.S. PATENT DOCUMENTS

| | | | |
|---|---|---|---|
| 6,876,623 B1 | 4/2005 | Lou et al. | |
| 8,006,168 B2 * | 8/2011 | Reznic .................. | H03M 13/35 375/240.2 |
| 2011/0109810 A1 | 5/2011 | Li et al. | |
| 2011/0134994 A1 | 6/2011 | Lu et al. | |

FOREIGN PATENT DOCUMENTS

| | | |
|---|---|---|
| WO | WO2007120245 | 10/2007 |
| WO | WO2008013883 | 1/2008 |
| WO | WO2008057110 | 5/2008 |
| WO | WO2008151987 | 12/2008 |
| WO | WO2009061363 | 5/2009 |
| WO | WO2010054719 | 5/2010 |

OTHER PUBLICATIONS

Lee et al., "Reducing IPTV Channel Switching Time Using H.264 Scalable Video Coding," IEEE Transactions on Consumer Electronics, vol. 54, No. 2, May 2008, pp. 912-919.

Morcos et al., "Unequal Error Protection of H.264 Scalable Video Coding Using Discrete Wavelet Transfrom Within a Lognormal Shadowing Environment," 2011 IEEE International Conference on Consumer Electronics, Berlin, DE (ICCE-Berlin), 2011 IEEE, pp. 66-70.

Shankar, "Unequal Error Protection for H.264/SVC Bitstream," Thesis presented to San Diego State University for MS in Electrical Engineering, approved Jun. 7, 2010.

Hellge etal., "Mobile TV with Long Time Interleaving and Fast Zapping," 2012 IEEE Int'l. Conference on Multimedia & Expo Workshops (ICMEW 2012), Jul. 9-13, 2012, Melbourne, Australia, IEEE Computer Society, US, pp. 623-628.

* cited by examiner

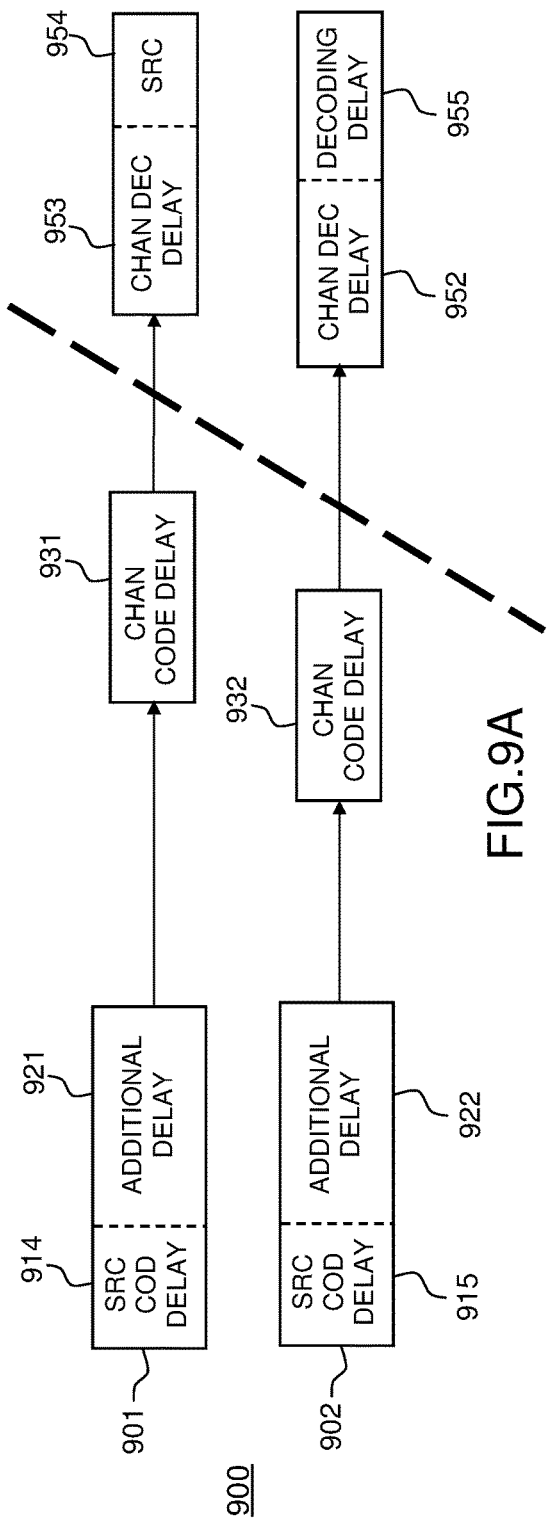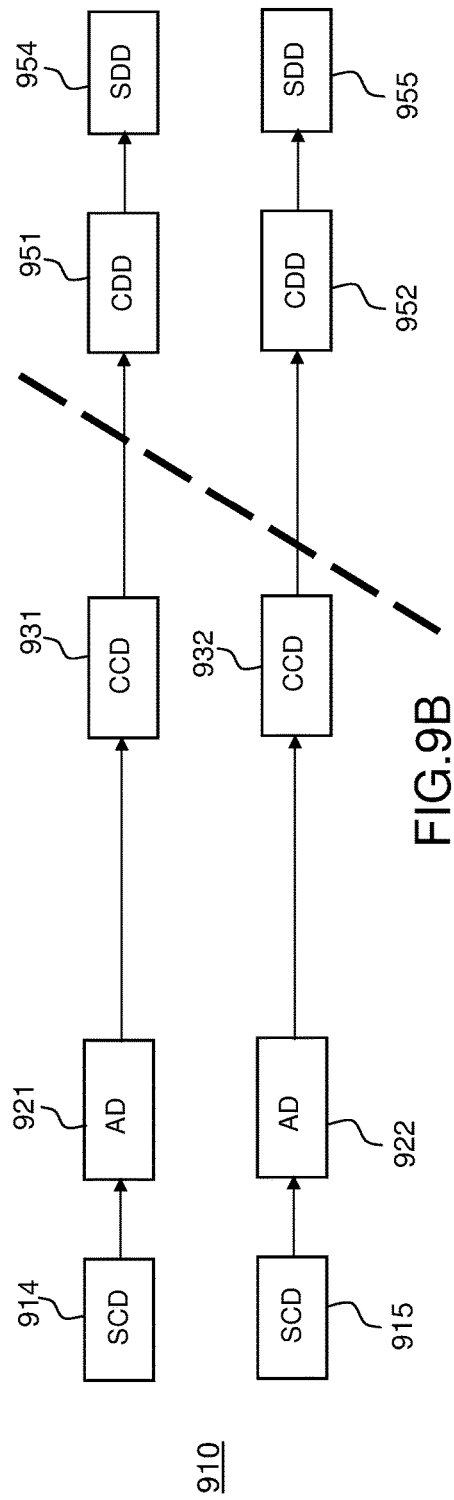

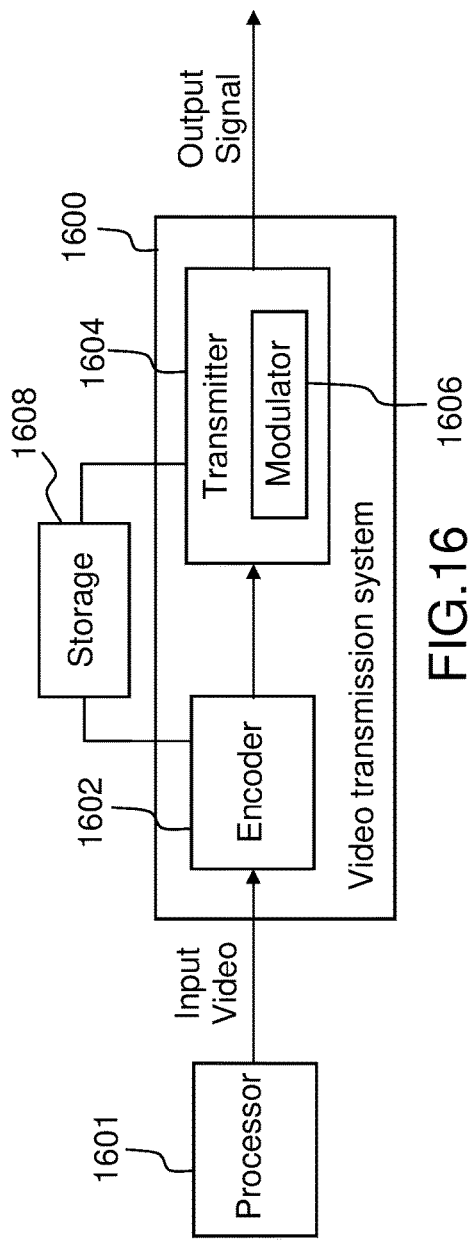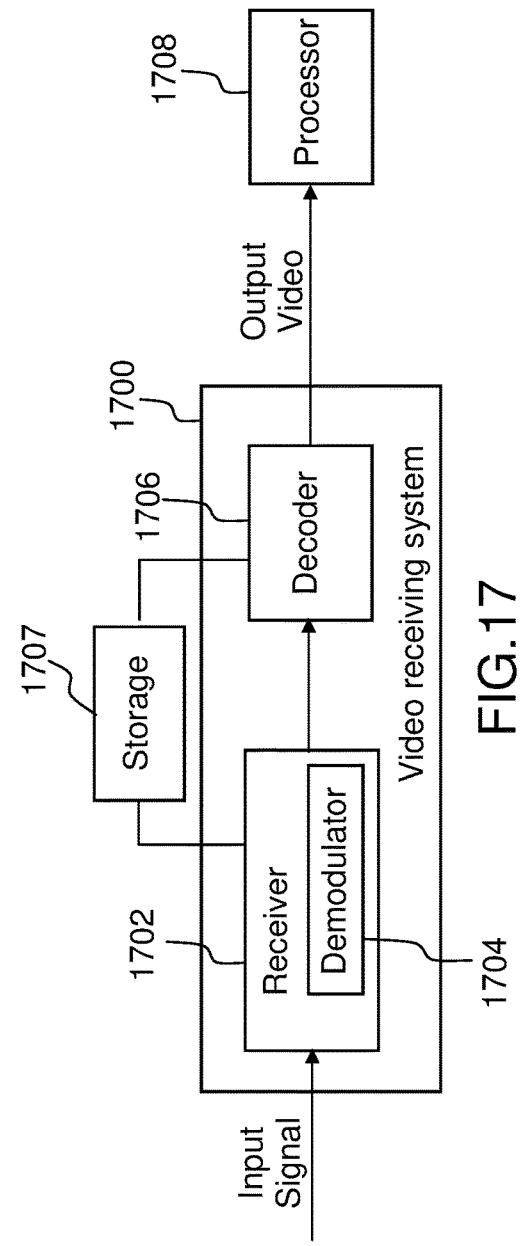

ROBUST DIGITAL CHANNELS

TECHNICAL FIELD

Implementations are described that relate to digital communication. Various particular implementations relate to providing robust digital transmission channels.

BACKGROUND

Current digital transmission channels typically suffer from a variety of limitations. The limitations often increase the delay experienced by a user after requesting a new programming channel, until the user is able to view the new programming channel. Additionally, the overall quality of television reception is often poor, particularly at marginal reception levels.

SUMMARY

According to a general aspect, a first layer of a picture is encoded using a first level of error protection. The encoded first layer has a first decoding delay. A second layer of the picture is encoded using a second level of error protection. The encoded second layer has a second decoding delay. The second level of error protection is lower than the first level of error protection, and the second decoding delay is longer than the first decoding delay.

According to another general aspect, a signal or signal structure includes a first layer section for a picture. The first layer section includes an encoded first layer of the picture that provides a first level of error protection for the first layer of the picture and that has a first decoding delay. The signal or signal structure also includes a second layer section for the picture. The second layer section includes an encoded second layer of the picture that provides a second level of error protection for the second layer of the picture and that has a second decoding delay. The second level of error protection is lower than the first level of error protection, and the second decoding delay is longer than the first decoding delay.

According to another general aspect, an encoding of a first layer of a picture is decoded. The encoding of the first layer has a first level of error protection and a first decoding delay. An encoding of a second layer of the picture is decoded. The encoding of the second layer has a second level of error protection and a second decoding delay. The second level of error protection is lower than the first level of error protection, and the second decoding delay is longer than the first decoding delay.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

FIG. 9A provides a block diagram depicting a variation of the system of FIG. 3 that focuses in part on source encoding and decoding.

FIG. 9B provides a block diagram depicting a variation of the system of FIG. 9A that provides separate blocks for the source encoding and decoding.

FIG. 16 provides a block diagram depicting an implementation of a video transmission system.

FIG. 17 provides a block diagram depicting an implementation of a video reception system.

DETAILED DESCRIPTION

Figure 1:
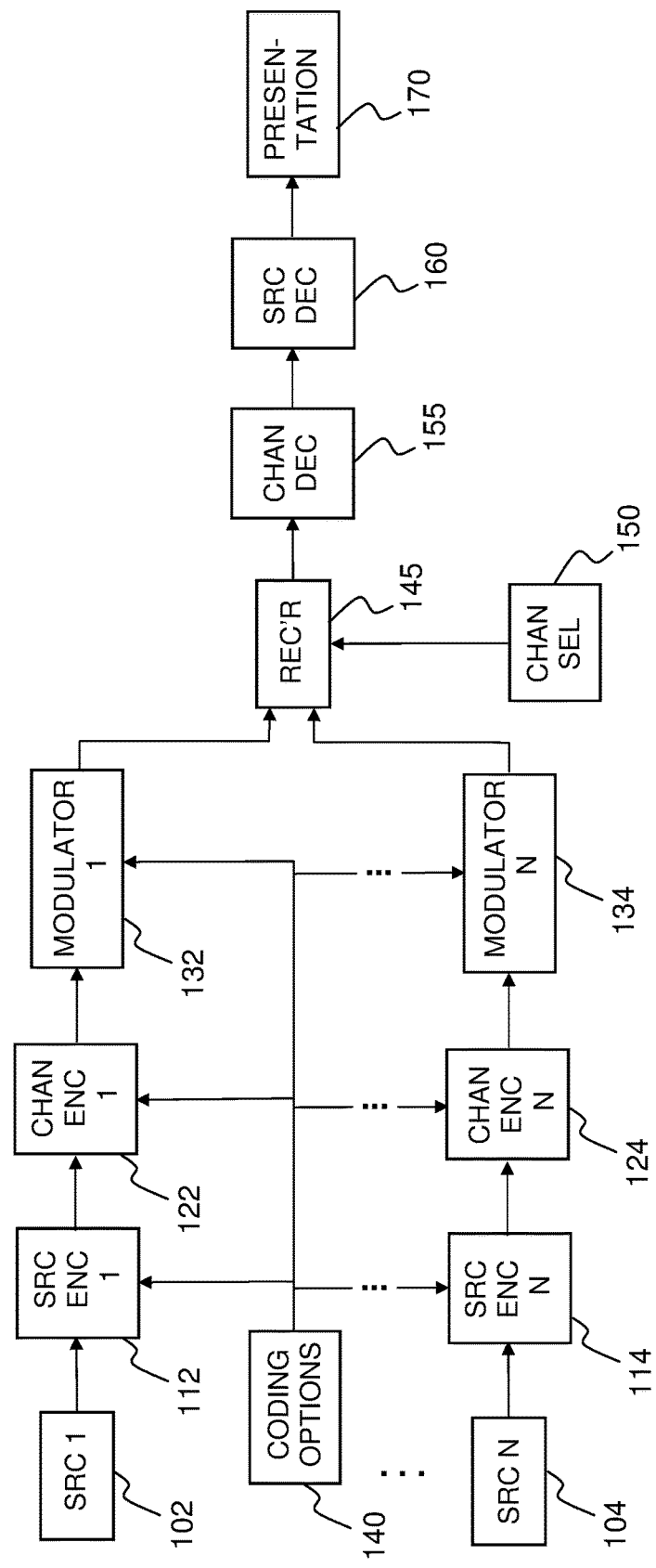
FIG. 1 provides a block diagram depicting an implementation of a system for delivering and receiving digital content.

At least one implementation is described that seeks to improve programming channel change time and overall quality of television reception by using multiple transmission channels, each with different tradeoffs of bitrate and robustness of signal. Note that programming channel change time is often referred to simply as channel change time.

The inventors have determined that many typical digital video systems suffer from a cliff effect in transmission channel coding. Note that transmission channel coding will typically be referred to in this application as channel coding. A "cliff effect" generally describes a situation in which, at marginal reception levels, the signal is received either perfectly or not at all. Additionally, the inventors have also determined that (programming) channel "surfing" or "zapping" is hindered by long signal acquisition time of channel-coded and source-coded material. Typical digital video systems having these problems often include, for example, digital video broadcasting ("DVB") systems and Advanced Television Systems Committee ("ATSC") digital television systems.

Various methodologies can address, at least in part, some of these problems. Some methodologies involve changing elements of source coding. For example, changing the period between I-frames, changing the bitrate, or changing the resolution. Additionally, or alternatively, some methodologies involve changing elements of channel coding. For example, changing the transmission channel bandwidth, changing the coding rates, changing the modulation methods, or changing the error correction codes.

Unfortunately, many of these elements are often conflicting. For example, increasing the rate of I-frames can increase the required bitrate or reduce the image quality. As an additional example, stronger error correction can consume bits (or bandwidth) that could otherwise be used to carry image data, and this can reduce the effective bitrate or the image quality. Broadcasters have tried to find a balance in the tradeoffs between competing system requirements. However, the current balance has typically resulted in digital receivers that exhibit the "cliff effect" in marginal reception areas, and exhibit a longer programming channel change time in comparison to the older analog receivers.

At least one implementation described in this application provides a system that encodes digital content using a layered encoding system. Each layer selects its own combination of source coding and channel coding. The first layer is provided with source coding and channel coding such that the first layer is robust against noise, and has a short decoding delay. In this way, the first layer is robust against the cliff effect, and is suitable for use in programming channel zapping. Accordingly, after a programming channel zap, an initial picture is available quickly with a first layer decoding. Subsequent layers are provided with source coding and channel coding such that these layers have a desired robustness against noise, and have successively longer decoding delays. In this way, after a programming channel zap, successive pictures have progressively higher quality than the initial picture.

In one such implementation, source coding and decoding is provided by an audio codec (coder/decoder) and/or a video codec. In the codec(s), the coded data is identified by priority, or level of importance, in quality of reconstruction. This priority is typically referred to as "source coding priority" because, to a large extent, the source coding determines the quality by, for example, proper selection of the type of source code, the number of bits used, the level of quantization used, and other parameters. Additionally, in typical systems, the channel coding is primarily concerned with protecting against errors.

The coding and reconstruction is performed such that high priority data can support a certain level of reconstruction without the lower priority data, although the reconstruction will be at a lower quality or resolution if the lower priority data is not available. Such codecs are typically referred as "scalable" codecs. Note that in some implementations, compressed data from non-scalable codecs is processed into a scalable form.

AVC with the SVC (Scalable Video Coding) extension (Annex G) provides an example of a typical scalable system. In general, SVC enables the transmission of a high-quality video bitstream as a subset of bitstreams composed of a (usually simple) base layer and a number of enhancement layers, each of which successively builds upon the quality of the base layer during the decoding process. Each successive enhancement layer might not be fully decodable until the base layer and lower enhancement layers are decoded. This is not a strict requirement but may be a limitation of practical implementations.

More generally, a video bit stream is typically called scalable when parts of the stream can be removed in a way that the resulting sub-stream forms another valid bit stream for some target decoder, and the sub-stream represents the source content with a reconstruction quality that is less than that of the complete original bit stream but is high when considering the lower quantity of remaining data. Bit streams that do not provide this property are referred to as single-layer bit streams. The usual modes of scalability are temporal, spatial, and quality scalability. Spatial scalability and temporal scalability describe cases in which subsets of the bit stream represent the source content with a reduced picture size (spatial resolution) or frame rate (temporal resolution), respectively. With quality scalability, the substream provides the same spatiotemporal resolution as the complete bit stream, but with a lower fidelity—where fidelity is often informally referred to as signal-to-noise ratio (SNR). Quality scalability is also commonly referred to as fidelity or SNR scalability. More rarely required scalability modes are region-of-interest (ROI) and object-based scalability, in which the sub-streams typically represent spatially contiguous regions of the original picture area. The different types of scalability can also be combined, so that a multitude of representations with different spatio-temporal resolutions and bit rates can be supported within a single scalable bit stream.

A separate source-coded stream is generated for each of the different levels, or priorities, of data. Each source-coded stream is then routed to a separate transmission channel based on source coding priority. Each transmission channel then undergoes channel coding with parameters that are commensurate for the level of source coding priority, as further explained below.

Note that channel coding parameters can be selected to achieve a variety of different tradeoffs between different measures of system performance. Such measures of system performance include, for example, robustness, bitrate, decoding delay, transmission channel capacity, bandwidth, robustness against burst noise, transmission channel delay, signal acquisition times, SNR, and error rate. Various channel coding parameters have different impacts on these measures of system performance, as is known. For example, a high strength FEC may add more redundancies in the bitstream which increases bitrate or reduces transmission channel capacity, a deeper interleaver which protects against burst noise may increase transmission channel delay and signal acquisition times, a higher symbol rate may increase bandwidth, and more bits per symbol may require higher SNR to achieve the same error rate. The channel code can be optimized to achieve a desired effect. Additionally, source coding and channel coding can be jointly optimized, as is known.

Each transmission channel may be a logical or a physical (for example, RF) channel, as known by those skilled in the art. The following table shows an example of source coding priority to channel coding options. Note that the following examples do not necessarily define all of the variables that would be present in a typical system. Other variables can include, for example, bandwidth and symbol rate.

Source Coding Priority Source Coding Option (Examples)
HIGH Low spatial resolution (for example, 352×240 resolution), temporal resolution (for example, 15 frames/second), or SNR resolution (for example, pixel values may be in error by more than one just-noticeable-difference (jnd), as is known in the art).
MEDIUM Medium spatial resolution (for example, 704×480 resolution), temporal resolution (for example, 30 frames/second), or SNR resolution (for example, pixel values may be in error by one jnd).
LOW High spatial resolution (for example, 1920×1080 resolution), temporal resolution (for example, 60 frames/ second), or SNR resolution (for example, pixel values may be in error by less than one jnd).

Source Coding Priority Channel Coding Option (Examples)
HIGH Higher FEC, shorter interleaving, lower bits per symbol
MEDIUM Medium FEC, medium interleaving, medium bits per symbol
LOW Lowest FEC, longer interleaving, highest bits per symbol Following is a specific implementation, provided as an example, without limiting other implementations. The implementation includes three layers, as follows.

Layer one:
  Low spatial resolution, for example, 352×240 resolution
  Low temporal resolution, for example, 15 frames per second
  Low SNR, for example, pixel values may be in error by more than one jnd
  Higher FEC, for example, a convolutional code of ½ code rate (other codes can include, for example Reed-Solomon codes)
  shorter interleaving, for example, 50 ms (milliseconds) interleave delay (interleaving can also be specified by the size of the block that is being interleaved, rather than by the interleave delay)
  lower bits per symbol, for example, 2 bits per symbol.

Layer two:
  Medium spatial resolution, for example, 704×480 resolution
  Medium temporal resolution, for example, 30 frames per second
  Medium SNR, for example, pixel values may be in error by one jnd
  Medium FEC, for example, a convolutional code of ¾ code rate
  medium interleaving, for example, 200 ms interleave delay
  medium bits per symbol, for example, 4 bits per symbol.

Layer three:
  High spatial resolution, for example, 1920×1080 resolution
  High temporal resolution, for example, 60 frames per second
  High SNR, for example, pixel values may be in error by less than one jnd
  Lowest FEC, for example, a convolutional code of 7/8 code rate
  longer interleaving, for example, 500 ms interleave delay
  highest bits per symbol, for example, 8 bits per symbol.

In many described implementations, it is implicit that we are pushing the concept that we want to do different things for, for example, each transmission channel, because we can tolerate a different error characteristic for each transmission channel (or, for each layer). So, for example, in some transmission channels or layers we want to save bits (bandwidth), but are willing to incur processing delays. Thus, in many implementations, we prefer to add interleaving in higher scalable layers in order to save bits on FEC and on bits/symbol. Conversely, in many implementations, for the base layer, we use extra bits in order to reduce processing delays.

Of course, the above methodology can be extended to any number of source coding priorities and transmission channels. It can be seen by those skilled in the art that various channel coding options (and also source coding options) impart a different end-to-end delay from encoder input to decoder output.

Referring to FIG. 1, a system 100 is provided for delivering content from various sources to a user. The system 100 focuses, in particular, on the source coding and the channel coding. Accordingly, a variety of functions that are common to standard communications systems are neither shown in FIG. 1 nor discussed.

Such common functions include, for example, in various implementations, clocks, power supplies, multiplexers, signal shapers, and antennas.

The system 100 includes multiple sources of content, including a first source 102 (source 1), through an Nth source (source N) 104. Each source 102 through 104 provides, for example, a digital program for viewing on a television ("TV"). The sources are, for example, and in different implementations, a broadcast source, a cable source, a satellite source, a DVD player, or a hard disk.

Each source 102 through 104 is coupled to a source encoder. The source 1 102 is coupled to an input side of a source encoder 1 112, and the source N 104 is coupled to an input side of a source encoder N 114. The source encoders 112 through 114 perform source encoding of the corresponding source. As discussed in an implementation above, each of the source encoders 112 through 114 can provide different source encoding to different priority levels of data that is provided by a corresponding source. Accordingly, in typical implementations, each source encoder provides multiple separate streams of source-encoded data, for a given source (for example, a program), with each stream having a different priority.

For example, in one implementation, the source encoder 1 112 is a scalable encoder that receives a program from the source 1 102. The program is source encoded to provide different layers of source-encoded outputs, with each source-encoded output having a different priority level.

In another example, the program is divided into scalable layers, having designated priorities, prior to source encoding. In one such implementation, the source encoder 1 112 includes multiple source encoding modules. The source encoder 1 112 uses a separate source encoding module to source encode each layer (having a designated priority level) of the program.

In another implementation, the program data is divided into multiple priority levels, with a separate stream being produced for each priority level. The separate streams are not scalable streams however. Rather, they are independent streams representing the program. These independent streams are referred to as "versions" of the program, and can be presented individually as a representation of the program. Various implementations provide versions that have an increasing quality and robustness. Note also that although the versions are independent presentable to a viewer on, for example, a TV screen, the versions can be coded independently or dependently depending on the implementation.

The system 100 is used in at least one implementation that provides different versions of a program. In this implementation, the source encoder 1 112 includes multiple source encoding modules. However, the source encoder 1 112 of this implementation is not a scalable encoder, and each of the multiple source encoding modules operates on a separate stream and priority level. The source encoder 1 112 produces an output stream for each priority level.

Each source encoder 112 through 114 is coupled to a channel encoder. An output side of the source encoder 1 112 is coupled to an input side of a channel encoder 1 122. An output side of the source encoder N 114 is coupled to an input side of a channel encoder N 124. The channel encoders 122 through 124 perform channel encoding of the corresponding source-encoded data.

As discussed in an implementation above, each of the channel encoders 122 through 124 can provide different channel encoding to the different priority levels of source-encoded data. As noted above, and discussed further below, for example with respect to FIGS. 3-8, each of the channel encoders 122 through 124 can also provide different channel encoding so as to provide different decoding delays to the different priority levels.

Continuing with the above example, in which each source encoder 112 through 114 has multiple source encoding modules, the channel encoder 1 122 includes multiple channel encoding modules. Each channel encoding module receives an output (a sub-stream) from the corresponding source encoder module. The sub-streams are separate source-encoded streams corresponding to different layers of a program, with each layer potentially having a different priority level. Each channel encoding module performs channel encoding on its input sub-stream. It should be clear that each channel encoding module of this implementation provides channel encoding for a different layer (and, potentially, priority level) of the program. The channel encoded layers are multiplexed in various implementations.

Each channel encoder 122 through 124 is coupled to a modulator. An output side of the channel encoder 1 122 is coupled to an input side of a modulator 1 132. An output side of the channel encoder N 124 is coupled to an input side of a modulator N 134. The modulators 132 through 134 provide modulation for the corresponding channel-encoded data.

Continuing with the above example, in which the channel encoders 122 through 124 each have multiple channel encoding modules, the modulator 1 132 includes multiple modulation modules. OFDM (Orthogonal Frequency-Division Multiplexing) is used in one or more implementations. Each modulation module receives an output (a sub-stream) from the corresponding channel encoding module. The sub-streams are separate channel-encoded streams corresponding to different layers of a program, with each layer potentially having a different priority level. Each modulation module performs modulation on its input sub-stream. It should be clear that each modulation module of this implementations provides modulation for a different layer (and, potentially, priority level) of the program. In various implementations, the outputs from the different modulation modules of, for example, the modulator 1 132 are provided as separate outputs (not shown in FIG. 1) of the modulator 1 132, or are combined and provided as a single output of the modulator 1 132.

The system 100 includes a coding options module 140 that provides input to the source encoders 112 through 114, the channel encoders 122 through 124, and the modulators 132 through 134. The coding options module 140 provides information indicating what type of source encoding, channel encoding, or modulation is to be performed by each respective block.

In various implementations, the coding options module 140 provides the same instructions to the source encoder 1 112 and to the source encoder N 114. For example, in one implementation, the source 1 102 and the source N 104 both provide television programs, and the same source encoding instructions are provided to both source encoders 102 and 104.

However, in other implementations, particularly when the content from the source 1 102 and the source N 104 are quite different, the coding options module 140 provides different instructions to the source encoder 1 112 and to the source encoder N 114. For example, in one implementation, the source 1 102 provides a broadcast television program, and the source N 104 provides one or more of cable Internet, wireless Internet, or DSL (digital subscriber line). Because these sources are different, the coding options module 140 provides different instructions to the source encoder 1 112 and to the source encoder N 114.

We continue now with the earlier implementations that included sub-modules for different layers with the source encoders 112 through 114, the channel encoders 122 through 124, and/or the modulation modules 132 through 134. For such implementations, the coding options module 140 provides, in certain implementations, separate instructions for each of the sub-modules.

The coding options module 140 can provide instructions in the form of parameters or other information that identifies the proper source coding, channel coding, or modulation to be performed. Various implementations use, for example, one or more of the following source codes, channel codes, and modulation techniques.

Source codes include, for example: block codes, arithmetic codes, run-length codes, quantization methods, predictive/differential encoding, and transform codes.

Channel codes include, for example: BCH codes, convolutional codes, and LDPC (low-density parity-check) codes, and interleaving techniques.

Modulation techniques include, for example: PSK, QPSK, 8-PSK, 16-QAM, 32-QAM, and 64-QAM.

Additionally, various implementations incorporate a user interface to allow a user to select the options.

The modulation modules 132 through 134 provide an output that is received by a receiver 145. The outputs of each of the modulation modules 132 through 134 can be transmitted, for example, separately or together.

The receiver 145 receives an input from a programming channel selector 150 that selects a programming channel to receive. Typical receiving operations include, for example, demodulation of the selected programming channel. The "programming channel" refers, in FIG. 1 to one of the available sources of content, such as, for example, the content from the source 1 102 or the content from the source N 104.

The receiver 145 provides a demodulated output of one or more transmission channels that have data for the selected programming channel. The demodulated output is provided to a channel decoder 155. The channel decoder 155 performs channel decoding on the received demodulated channel, and provides a channel decoded output.

The channel decoder 155 provides the channel decoded output to a source decoder 160. The source decoder 160 performed source decoding on the received channel decoded data, and provides a source decoded output.

The source decoder 160 provides the source decoded output to a presentation device 170. The presentation device 170 presents the selected and fully decoded channel to, for example, a user. The presentation device 170 is, for example, and in various implementations, one or more of a TV, a computer screen, a laptop, a tablet, a speaker (for audio content), or a cell phone. Various implementations provide the selected and fully decoded channel to other devices in addition to, or as an alternative to, the presentation device 170. Such other devices include, for example, storage devices, transmission devices, re-encoding devices, or other post-processors.

Figure 2:
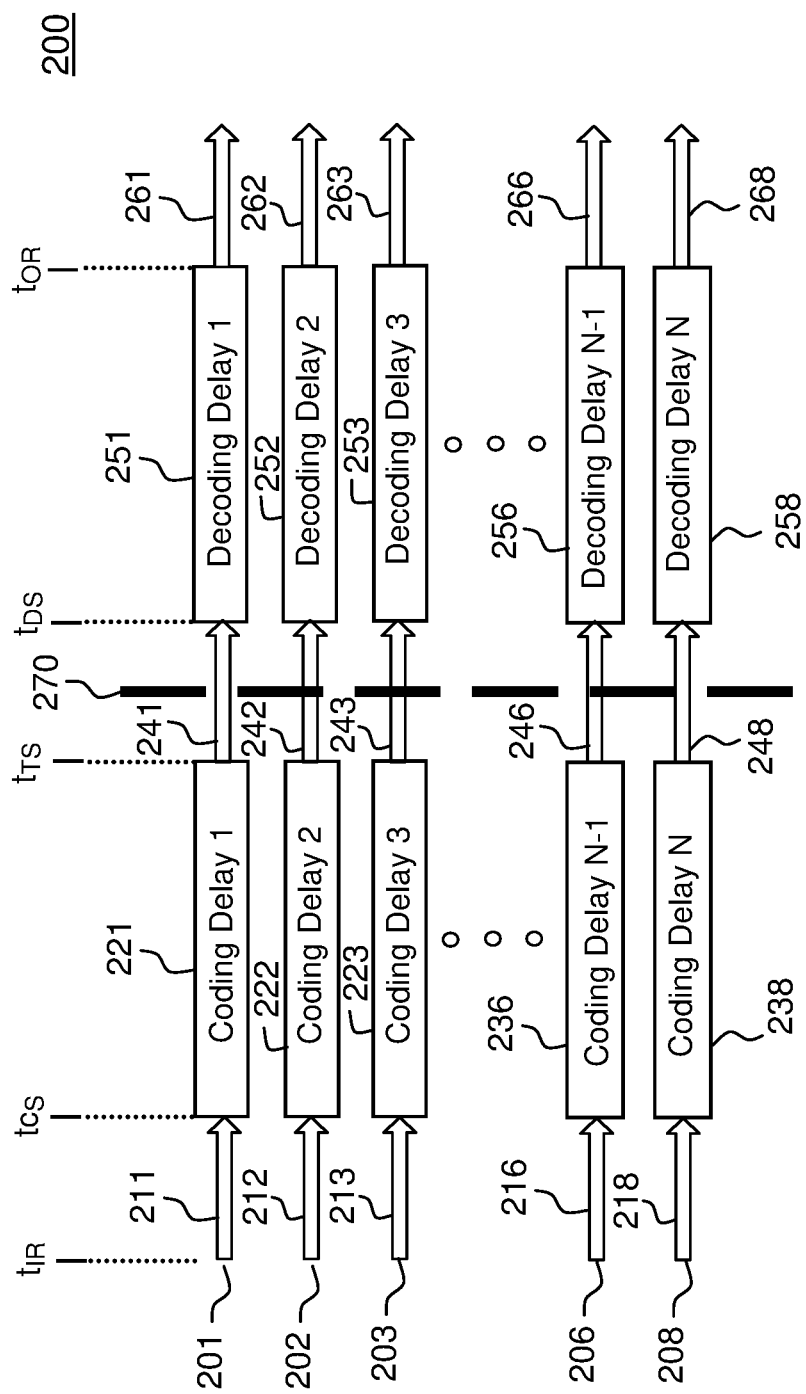
FIG. 2 provides a block diagram depicting another implementation of a system for delivering and receiving digital content.

Referring to FIG. 2, a system 200 is provided. The system 200 includes N data paths 201, 202, 203, 206, and 208. In various implementations, the N data paths are used, for example, to communicate scalable layers of a program, or non-scalable versions of the program.

Each of the data paths 201-208 includes an input, a coding delay, a transmission period, a decoding delay, and an output. Specifically:

(i) the data path 201 includes an input 211, a coding delay 1 231, a transmission period 241, a decoding delay 1 251, and an output 261, (ii) the data path 202 includes an input 212, a coding delay 2 232, a transmission period 242, a decoding delay 2 252, and an output 262, (iii) the data path 203 includes an input 213, a coding delay 3 233, a transmission period 243, a decoding delay 3 253, and an output 263, (iv) the data path 206 includes an input 216, a coding delay N−1 236, a transmission period 246, a decoding delay N−1 256, and an output 266, and (v) the data path 208 includes an input 218, a coding delay N 238, a transmission period 248, a decoding delay N 258, and an output 268.

The coding delays 231-238 represent the time (delay) associated with coding the inputs 211-218, respectively. The coding includes source coding and channel coding, and in certain implementations also includes selecting aspects of the modulation such as, for example, the constellation.

The decoding delays 251-258 represent the time (delay) associated with decoding the encoded inputs 211-218 that are received from the transmission periods 241-248, respectively. The decoding includes channel decoding and/or source decoding. Accordingly, the coding delays and the decoding delays include delays attributable, in various implementations, to source coding/decoding and/or channel coding/decoding. In implementations involving transmission of a modulated waveform, the incoming waveform is demodulated to produce a bitstream, which is also considered to be part of the decoding process in certain implementations.

The components of the system 200 are drawn to a scale reflecting the time spent by data traversing the system 200. For example, each data path 201-208 is shown as: (i) receiving its input 211-218 at a time $t_{IR}$, where IR stands for "input received", (ii) beginning coding at a time $t_{CS}$, where CS stands for "coding started", (iii) beginning transmission at a time $t_{TS}$, where TS stands for "transmission started", (iv) beginning decoding at a time $t_{DS}$, where DS stands for "decoding started", and (v) providing its output 261-268 at a time $t_{OR}$, where OR stands for "output received".

Thus, each of the data paths 201-208 provides its output 261-268 at substantially the same time, allowing, for example, the outputs 261-268 to be selected or combined. It can also be seen that the coding delays 231-238 are substantially the same length as each other, and that the decoding delays 251-258 are substantially the same length as each other.

Additionally, FIG. 2 includes a marker 270 identifying the transmission periods 241-248. Because the transmission periods 241-248 occur at the same time as each other, the marker 270 is shown as a vertical line.

Note that the system 200 is used in at least one implementation of the system 100. The coding delays 231-238 represent time (delay) used for performing the coding of, for example, the source encoder 1 112 and the channel encoder 1 122. The transmission periods 241-248 represent, for example, the transmission from the modulator 1 132 to the receiver 145. The decoding delays 251-258 represent time (delay) used for performing the decoding of, for example, the channel decoder 155 and the source decoder 160.

Figure 3:
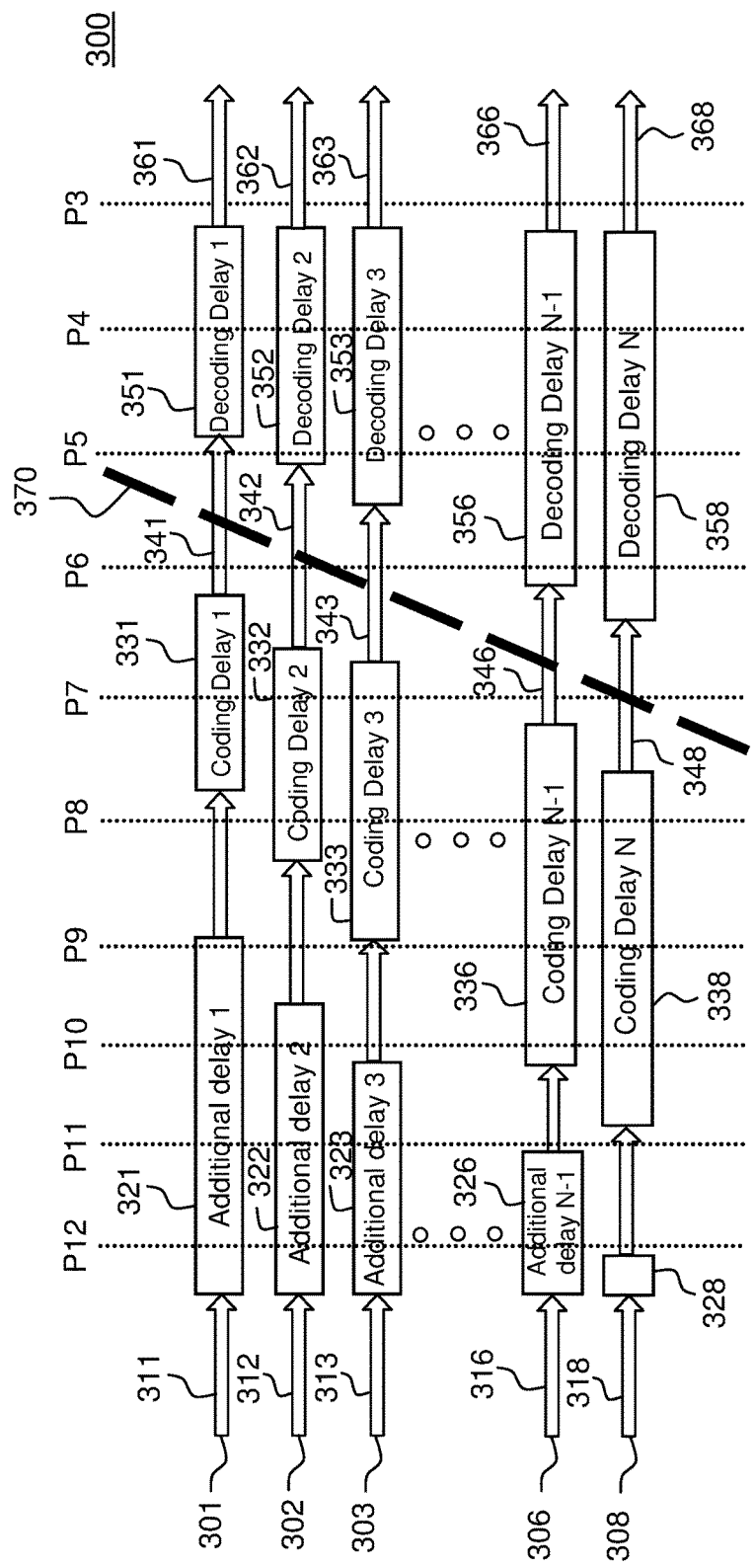
FIG. 3 provides a block diagram depicting a third implementation of a system for delivering and receiving digital content, depicted at steady state.

Referring to FIG. 3, a system 300 is provided. The system 300 includes N data paths 301, 302, 303, 306, and 308. In various implementations, the N data paths are used, for example, to communicate scalable layers of a program, or non-scalable versions of the program.

Each of the data paths 301-308 includes an input, an additional delay, a coding delay, a transmission period, a decoding delay, and an output. As can be seen, the data paths 301-308 differ from the data paths 201-208 at least in that the data paths 301-308 each include an additional delay. Specifically:

(i) the data path 301 includes an input 311, an additional delay 1 321, a coding delay 1 331, a transmission period 341, a decoding delay 1 351, and an output 361, (ii) the data path 302 includes an input 312, an additional delay 2 322, a coding delay 2 332, a transmission period 342, a decoding delay 2 352, and an output 362, (iii) the data path 303 includes an input 313, an additional delay 3 323, a coding delay 3 333, a transmission period 343, a decoding delay 3 353, and an output 363, (iv) the data path 306 includes an input 316, an additional delay N−1 326, a coding delay N−1 336, a transmission period 346, a decoding delay N−1 356, and an output 366, and (v) the data path 308 includes an input 318, an additional delay N 328, a coding delay N 338, a transmission period 348, a decoding delay N 358, and an output 368.

The coding delays 331-338 represent the time (delay) associated with coding the inputs 311-318, respectively. The coding includes source coding and channel coding, and in certain implementations also includes selecting aspects of the modulation such as, for example, the constellation.

The additional delays 321-328 represent the time (delay) that the data paths essentially hold the data before, during, and/or after the coding is performed.

The decoding delays 351-358 represent the time (delay) associated with decoding the encoded inputs 311-318 that are received from the transmission periods 341-348, respectively. The decoding includes channel decoding and source decoding. In implementations involving transmission of a modulated waveform, the incoming waveform is demodulated to produce a bitstream, which is also considered to be part of the decoding process in certain implementations.

The components of the system 300 are drawn to a scale reflecting the time spent by data traversing the system 300. As can be seen, data in the data paths 301-308 start out in the system 300 at the same time, but progress at different speeds through the various components.

In more detail, each data path 301-308 receives its input 311-318 at the same time, and begins the additional delay at the same time. However, the additional delays 321-328 are of different lengths from each other, and the coding delays 331-338 are of different lengths from each other. As a result, the data paths 301-308 enter the coding delays 331-338 at different times from each other, begin transmission at different times from each other, and enter the decoding delays at different times from each other. The end-to-end transit time for each of the data paths 301-308 are the same, and, therefore, the data paths 301-308 provide their respective outputs 361-368 at substantially the same time. Because each of the data paths 301-308 provides its output 361-368 at substantially the same time, this allows various implementations, for example, to select or to combine the outputs 361-368.

Additionally, FIG. 3 includes a marker 370 identifying the transmission periods 341-348. Because the transmission periods 341-348 occur at staggered times for any given picture, the marker 370 is shown as a diagonal line. At any given point in time, each data path 301-308 will generally be transmitting some data. The data will be, for example, a scalable layer of a picture, or a version of a picture. However, for a given picture, each data path 301-308 will transmit its respective layer (or version) in a staggered manner at different times from each other. This is described in more detail below.

FIG. 3 also depicts ten different pictures P3 through P12 making their way through the system 300. Each of the pictures P3 through P12 enters the system 300 on the left and progress to the right. Additionally, because the system 300 is drawn to a scale reflecting the time spent by data traversing the system 300, each of the pictures P3 through P12 progresses through all of the data paths 301-308 at the same rate. The progression of the pictures P3 through P12 is shown by the dashed lines extending down from the labels "P3" through "P12", indicating that the respective picture has progressed through the each of the data paths 301-308 up to the point of the dashed line. Therefore, because the pictures P3 through P12 enter the system 300 in order, with P3 entering first and P12 entering last, P3 is shown as having progressed all the way through the system 300, whereas P12 is still toward the beginning of the system 300.

In more detail, it can be seen from FIG. 3 that:
(i) P3 is available as output on each of the data paths 301-308.
(ii) P4 is being decoded by each of the data paths 301-308.
(iii) P5 is being transmitted by the data path 301, and is being decoded by the data paths 302-308.
(iv) P6 is being transmitted by the data paths 301-303, and is being decoded by the data paths 306-308.
(v) P7 is being coded by the data paths 301-303, and is being transmitted by the data paths 306-308.
(vi) P8 is being is being provided to the coding delay by the data path 301, and is being coded by the data paths 302-308.
(vii) P9 is being delayed by the data path 301, is being provided to the coding delay by the data paths 302-303, and is being coded by the data paths 306-308.
(viii) P10 is being delayed by the data paths 301-302, is being provided to the coding delay by the data path 303, and is being coded by the data paths 306-308.
(ix) P11 is being delayed by the data paths 301-303, and being provided to the coding delay by the data paths 306-308.
(x) P12 is being delayed by the data paths 301-306, and is being provided to the coding delay by the data path 308.

FIG. 3 represents a steady state for the system 300. The state is steady for at least the reason that all components of the system 300 are processing data from pictures. Additionally, at least for the implementation shown in FIG. 3, the state is steady because each data path 301-308 has output for a given picture.

As noted earlier, the system 300 differs from the system 200 at least in that the system 300 includes the additional delays 321-328. The system 300 includes the additional delays 321-328 before the coding delays 331-338. However, other implementations include the additional delays 321-328, for example, after the coding delays 331-338, or even on both sides of the coding delays 331-338.

It is assumed in the system 300 that different coding is used for each of the data paths 301-308. The different coding causes the coding delays 331-338 to have different lengths from each other, and causes the decoding delays 351-358 to have different lengths from each other. The additional delays 321-328 are introduced into the data paths 301-308, at least in part, so that the total end-to-end system delay remains constant across each of the data paths 301-308.

Note that the system 300 is used in at least one implementation of the system 100. The coding delays 331-338 represent time (delay) used for performing the coding of, for example, the source encoder 1 112 and the channel encoder 1 122. The additional delays 321-328 represent time (delay) that can be added in, for example, the source encoder 1 112 and/or the channel encoder 1 122, or that can be added in, for example, a buffer before or after the source encoder 1 112 and/or the channel encoder 1 122. The transmission periods 341-348 represent, for example, the transmission from the modulator 1 132 to the receiver 145. The decoding delays 351-358 represent time (delay) used for performing the decoding of, for example, the channel decoder 155 and the source decoder 160.

Figure 4:
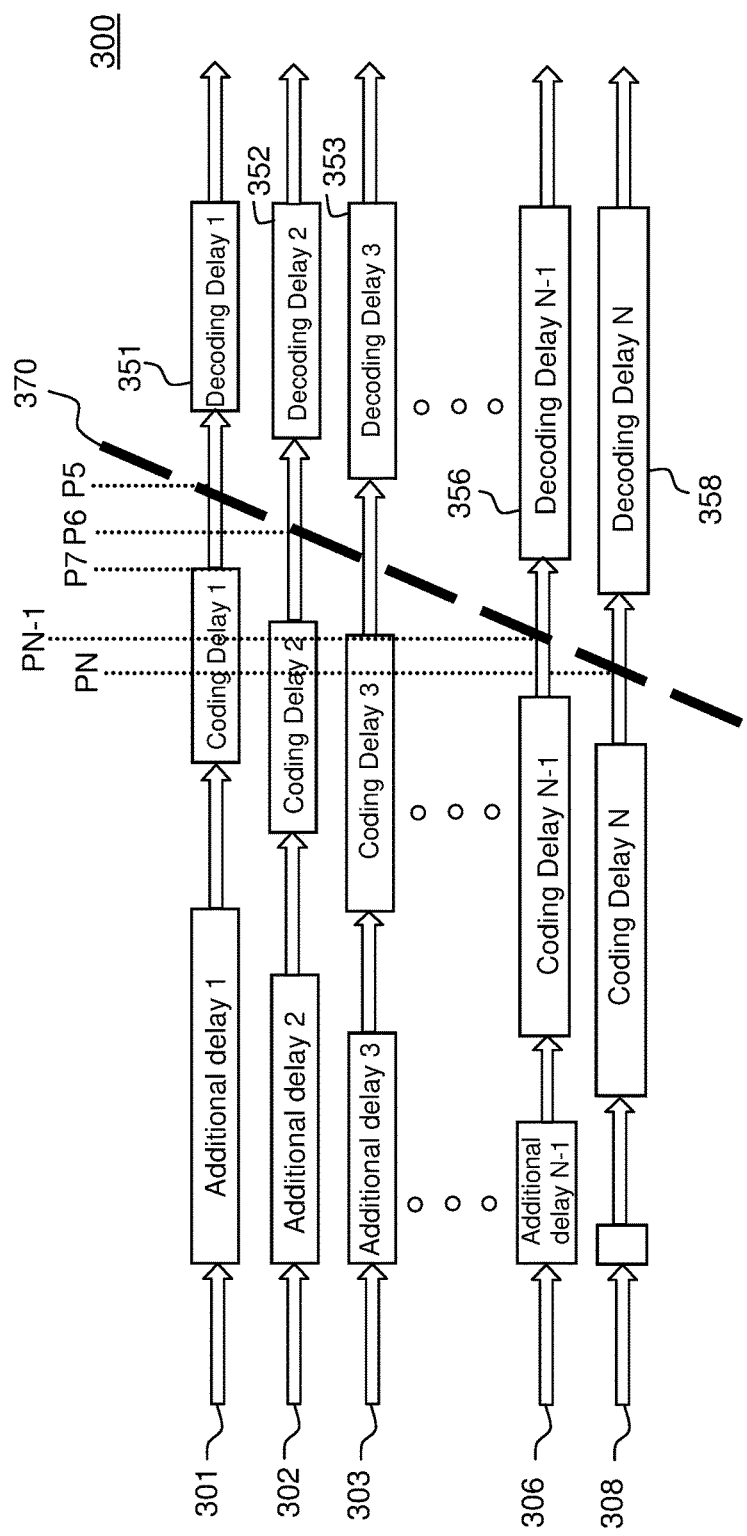
FIG. 4 provides a block diagram depicting the system of FIG. 3 after a program change.

Referring to FIG. 4, the system 300 is shown with a different set of pictures traversing through the system 300, and at a point in time when the steady state of FIG. 3 is disrupted. The disruption is caused, for example, by a request for a "programming channel" change. "Programming channel" change refers to a change in the content source, and to any change among the data paths 301-308. "Programming channel" change will often be referred to as program change, or content change.

Upon the request for a program change, the receiver of this implementation purges the receiver buffers, including the contents of the decoding delays 351-358. Additionally, the receiver switches to a new program. Note that the receiver refers to the components to the right of the marker 370, and the transmitter refers to the components to the left of the marker 370. As described with respect to FIG. 1, multiple different programs are being encoded and transmitted to the receiver at any given point in time. Therefore, when the receiver switches to a new program, the receiver can begin receiving that program, on all of the data paths 301-308 essentially immediately.

FIG. 4 shows that, for the new program, pictures P5 through PN (shown as P5, P6, P7, PN−1 and PN) are being transmitted on, respectively, the data paths 301-308. In practice, the new program is typically being transmitted by a transmitter for a different content source (see Source 1 102 through Source N 104 in FIG. 1) than the transmitter used for the previous program. Thus, in practice, the transmitter of FIG. 4 is typically different from the transmitter of FIG. 3. However, for simplicity of presentation, the same reference numerals are used for the components of the transmitters in FIGS. 3 and 4.

Upon receiving the request for a program change, and then changing to the new program, the receiver of FIG. 4 will start receiving data for the pictures P5 through PN. At the point in time when the programming channel change is received, the following description applies:
(i) Data for the picture P5 has already been transmitted on the data paths 302-308. Accordingly, the receiver can no longer receive that data. However, the data path 301 begins transmitting data for the picture P5 shortly after the programming channel change. Accordingly, the receiver for the data path 301 is able to receive data for the picture P5. This is further explained with respect to FIG. 5.
(ii) Data for the picture P6 has already been transmitted on the data paths 303-308. Accordingly, the receiver can no longer receive that data. However, the data path 302 begins transmitting data for the picture P6 shortly after the programming channel change. Accordingly, the receiver for the data path 302 is able to receive data for the picture P6 shortly after the programming channel change. Additionally, after transmitting data for the picture P5, the data path 301 will transmit data for the picture P6. Accordingly, the receiver for the data path 301 will be able to receive data for the picture P6 after a delay. As explained with respect to FIG. 3, the output data for the picture P6 will be available at substantially the same time on the data paths 301-302. This is further explained with respect to FIG. 6.

(iii) Data for the picture P7 has already been transmitted on the data paths 304-308 (note that the data path 304 is not shown). Accordingly, the receiver can no longer receive that data. However, the data path 303 begins transmitting data for the picture P7 shortly after the programming channel change. Accordingly, the receiver for the data path 303 is able to receive data for the picture P7 shortly after the programming channel change. Additionally, after transmitting data for the picture P6, the data path 302 will transmit data for the picture P7. Further, after transmitting data for the pictures P5 and P6, the data path 301 will transmit data for the picture P7. Accordingly, the receiver for the data path 302 will be able to receive data for the picture P7 after a short delay, and the receiver for the data path 301 will be able to receive data for the picture P7 after a longer delay. As explained with respect to FIG. 3, the output data for the picture P7 will be available at substantially the same time on the data paths 301-303. This is further explained with respect to FIG. 7.

(iv) The same pattern applies to the remaining pictures through PN.

Because the data path 301 has the shortest decoding delay (decoding delay 1 351), the picture P5 will be the first available picture as an output. Additionally, the picture P5 that is provided as output will have the quality associated with only the data path 301. Recall that the decoding delay 351 is the shortest of the decoding delays 351-358. Accordingly, the quality of the output of the data path 301 is presumed to be lower than the quality that is achieved by using the output of the data paths 302-308 (either individually, or combined with the preceding data paths). However, the quality of the output of the data path 301 is presumed to be sufficient to provide a "programming channel zap" picture.

Additionally, if, for example, the user stays at the new program and is not surfing programs, then the receiver of FIG. 4 will decode the pictures P6 through PN (and beyond). The quality of the output is presumed to increase when using the outputs of successive data paths, whether those outputs are scalable layers or separate versions. This is because a code with longer decoding delay is generally expected to provide superior results compared to a code having a shorter decoding delay. Accordingly, the successively decoded pictures P6 through PN will be of increasingly higher quality. Note that P6, for example, is also being processed in the transmitter of FIG. 4, at the point indicated by the dashed line extending down from the label "P6".

As just discussed, when a program change occurs, the data path 301 is able to advantageously provide an output before the data paths 302-308. This is because the data path 301 has the smallest decoding delay in the receiver, followed by the other data paths 302-308 in succession. In a scalable implementation, as each of the data paths 302-308 after decoding is able to add its contribution (to the previously decoded layers for that picture, from the other data paths) over time, the picture will be improved in spatial, temporal, quality, or some other dimension of scalable coding. This is further explained with respect to FIGS. 5-8.

In typical implementations, the highest priority information is transmitted in the data path 301 and the lowest priority information is transmitted in the data path 308. Additionally, information with intermediate values of priority is assigned in succession to the data paths 302-306.

The system 300 therefore advantageously provides for fast programming channel changes due to the small delay in the receiver side of the data path 301. Additionally, in typical implementations of FIG. 4, greater transmission channel robustness is placed on the higher priority data paths (or transmission channels) at the expense of the lower priority data paths. As a result, the overall ability of the viewer to enjoy signals in marginal reception areas is increased. Note that in implementations that do not have a bandwidth, or bit, constraint, robustness can be provided for every transmission channel. However, there is typically a trade-off between, on the one hand, bandwidth, bits, power, or processing time, and, on the other hand, quality or robustness.

Figure 5:
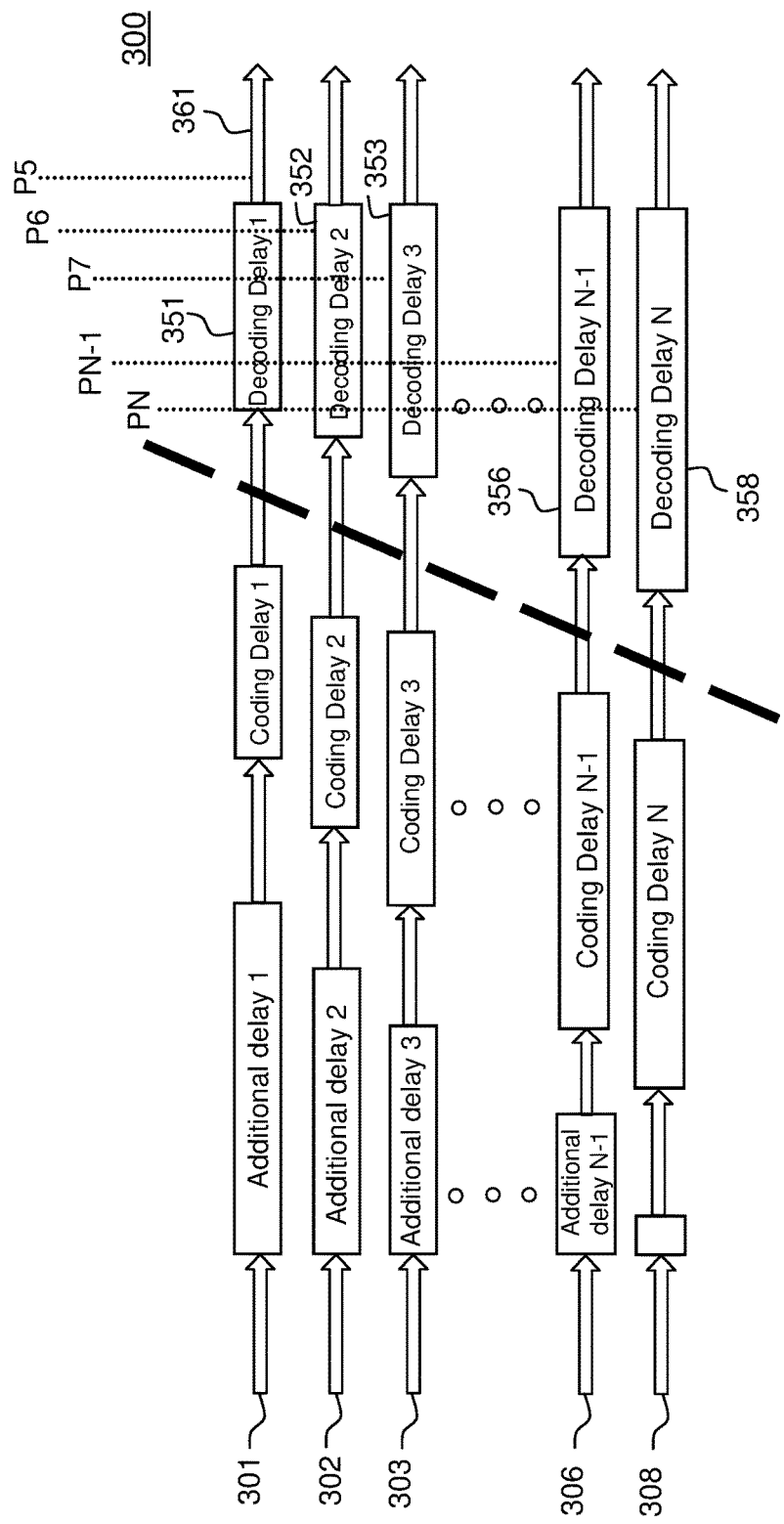
FIG. 5 provides a block diagram depicting the system of FIG. 4 a short time after the moment depicted in FIG. 4.

Referring to FIG. 5, the system 300 is shown a short time after the time indicated in FIG. 4. Enough time has elapsed for the picture P5 to have been decoded by the data path 301 and appear at the output 361 of the decoding delay 1 351. The picture P5 is, therefore, the first picture of the new program that is viewable by a user. As discussed above, there is no data available for the picture P5 on the data paths 302-308. This picture P5 could be used by the user in surfing programs, or the user may remain at the new program and view additional pictures as they become available.

The picture P6 has been received by the data paths 301-302, and is progressing through the decoding delays 351-352. The picture P7 has been received by the data paths 301-303, and is progressing through the decoding delays 351-353. The picture PN−1 has been received by the data paths 301-306, and is progressing through the decoding delays 351-356. The picture PN has been received by the data paths 301-308, is about to begin decoding on data path 301 as shown by being at the beginning of the decoding delay 1 351, and is progressing through the decoding delays 352-358.

Figure 6:
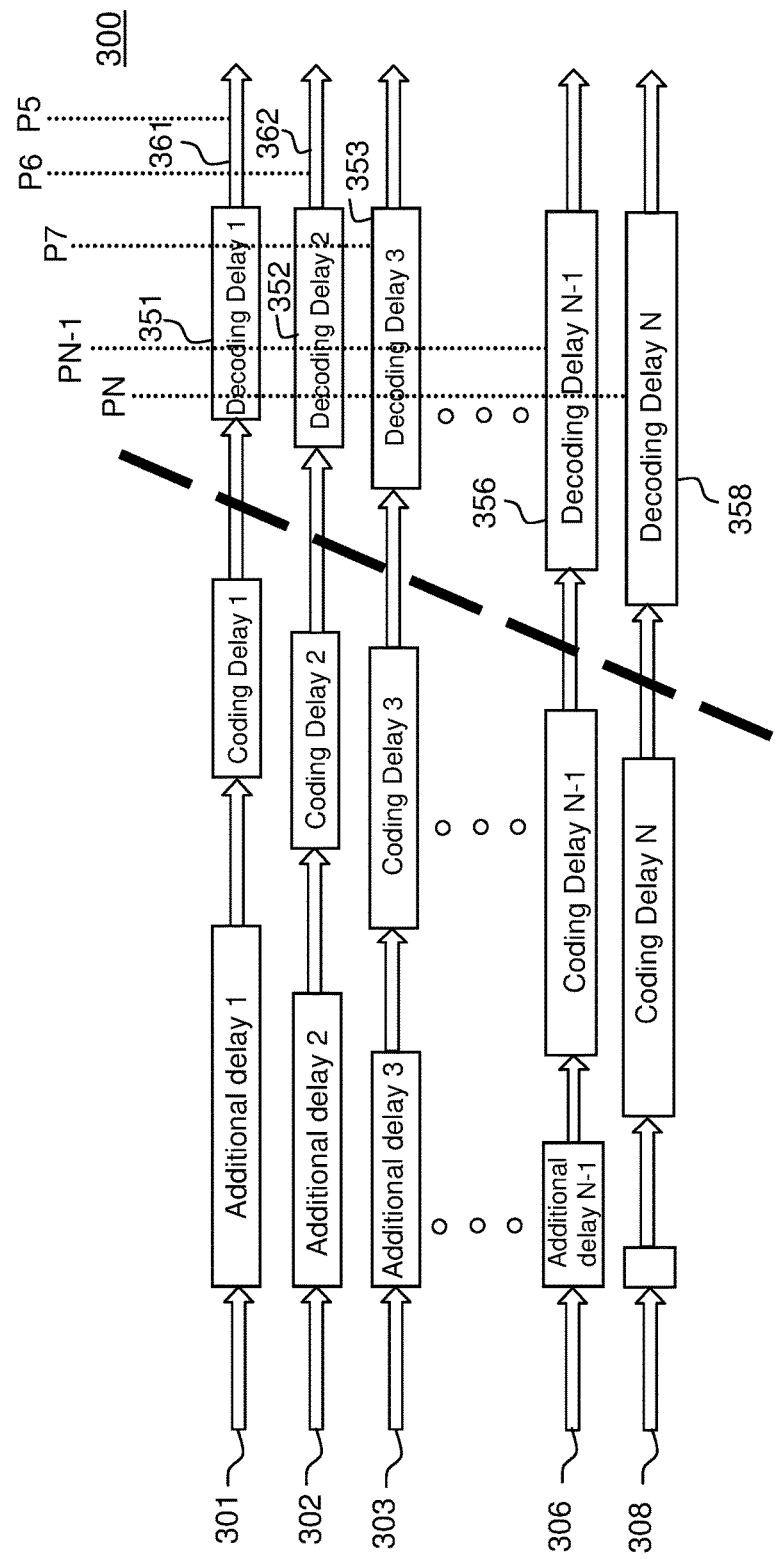
FIG. 6 provides a block diagram depicting the system of FIG. 5 a short time after the moment depicted in FIG. 5.

Referring to FIG. 6, the system 300 is shown a short time after the time indicated in FIG. 5. Enough time has elapsed for the picture P6 to have been decoded by the data paths 301-302 and appear at the output 361 of the decoding delay 1 351 and at the output 362 of the decoding delay 2 352. These two outputs 361-362, in a scalable implementation, can be combined to produce a version of the picture P6 that is of higher quality than either of the individual layers (the individual outputs 361-362), and is presumably of higher quality than the picture P5 that preceded the picture P6 on the data path 301. Thus, if a user views the picture P5 produced in FIG. 5 and the picture P6 produced from the outputs 361-362 of FIG. 6, the user will typically see an improvement in quality as these two pictures are displayed.

The picture P7 continues to progress through the decoding delays 351-353. The picture PN−1 continues to progress through the decoding delays 351-356. The picture PN has entered the decoding delay 1 351 and continues to progress through the decoding delays 352-358.

Figure 7:
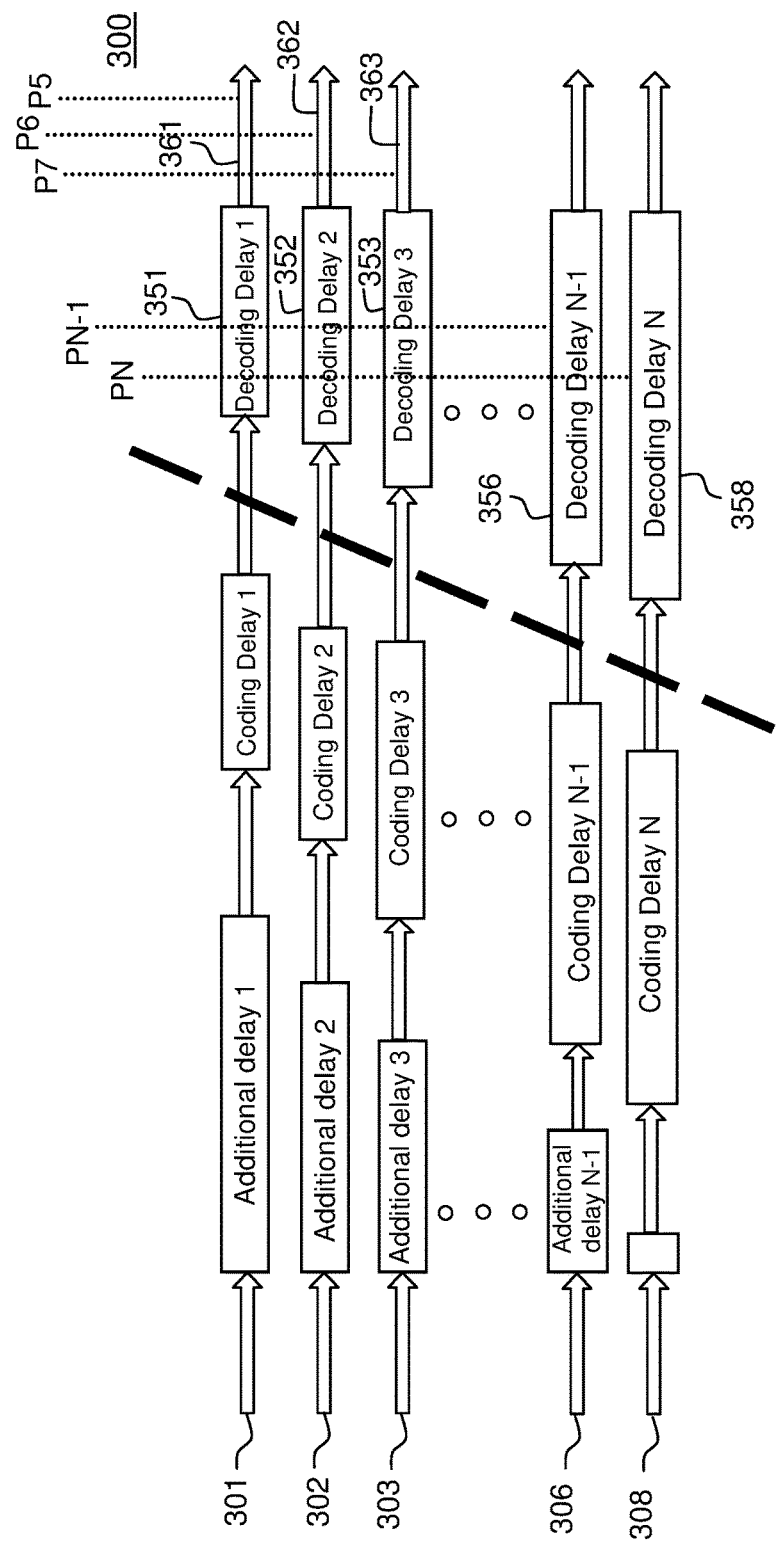
FIG. 7 provides a block diagram depicting the system of FIG. 6 a short time after the moment depicted in FIG. 6.

Referring to FIG. 7, the system 300 is shown a short time after the time indicated in FIG. 6. Enough time has elapsed for the picture P7 to have been decoded by the data paths 301-303 and appear at the outputs 361-363 of the decoding delays 351-353. These three outputs 361-363, in a scalable implementation, can be combined to produce a version of the picture P7 that is of higher quality than any of the individual layers (the individual outputs 361-363), and is presumably of higher quality than the picture P6 produced from two layers in FIG. 6. Thus, if a user views the picture P5 produced in FIG. 5, the picture P6 produced from the outputs 361-362 of FIG. 6, and the picture P7 produced from the outputs 361-363 of FIG. 7, the user will typically see an improvement in quality as these three pictures are displayed.

The picture PN−1 continues to progress through the decoding delays 351-356. The picture PN continues to progress through the decoding delays 351-358.

Figure 8:
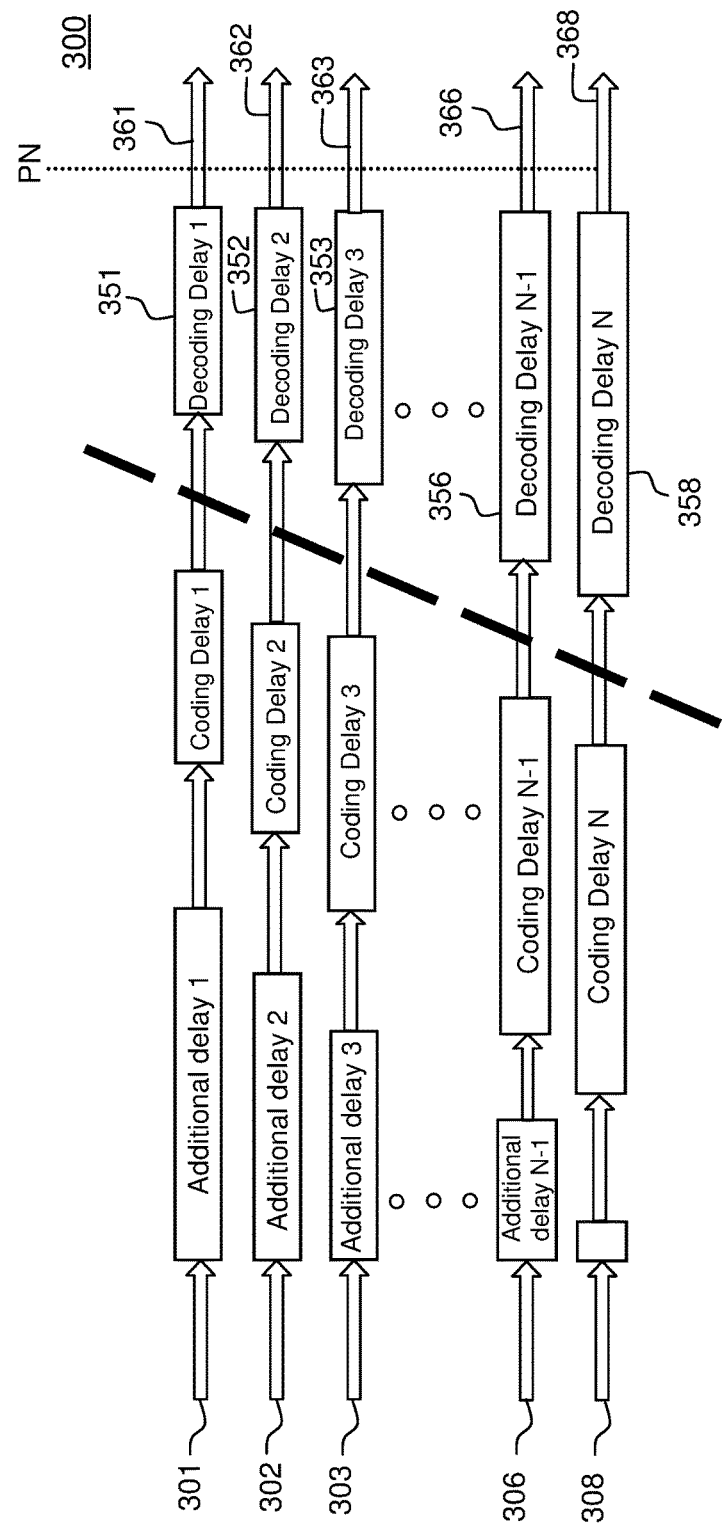
FIG. 8 provides a block diagram depicting the system of FIG. 7 a short time after the moment depicted in FIG. 7, with the system of FIG. 8 being at steady state.

Referring to FIG. 8, the system 300 is shown a short time after the time indicated in FIG. 7. Enough time has elapsed for (i) the picture PN−1 to have been decoded by the data paths 301-306 and appear at the outputs 361-366 of the decoding delays 351-356 (not shown), and (ii) the picture PN to have been decoded by the data paths 301-308 and appear at the outputs 361-368 of the decoding delays 351-358. These five outputs 361-368, in a scalable implementation, can be combined to produce a version of the picture PN that is of higher quality than any of the individual layers (the individual outputs 361-368), and is presumably of higher quality than the picture P5 through P7 produced in FIGS. 5-7 (and of higher quality than the picture PN−1 produced at a point in time between that shown in FIGS. 7 and 8). Thus, if a user views the picture P5 produced in FIG. 5, the picture P6 produced from the outputs 361-362 of FIG. 6, the picture P7 produced from the outputs 361-363 of FIG. 7, the picture PN−1 produced from the outputs 361-366 (not shown), and the picture PN produced from the outputs 361-368 of FIG. 8, the user will typically see an improvement in quality as these pictures are displayed.

FIG. 8 presents another steady state for the system 300. The buffers (the decoding delays 351-358, in particular) in each of the data paths 301-308 are full. As a result, in certain implementations, for every picture that is traversing the system 300, the system 300 will provide a layer or version at each of the outputs 361-368. Other implementations, however, do not provide a layer or version at each of the outputs for every picture that is traversing the system 300. Examples of such other implementations include particular temporal scalability implementations that transmit more frames in the enhanced layers than in the base layer.

FIGS. 3-8 illustrate a staircasing of (increasing) decoding delays, resulting in a the pictures P5 through PN becoming serially available after a programming channel zap (also referred to simply as a "channel zap"), with the quality of those pictures displaying an increasing staircasing in quality. As described above, after the system 300 receives a channel zap and leaves the steady state, the pictures P5 through PN become available in a progressive manner. The progressive availability is due in large part to the staircasing of the decoding delay elements 351-358, with each subsequent decoding delay element being longer than the previous. Further, the pictures P5 through PN have progressively higher quality. Note that in a typical implementation, the correct decoding delay is built or enforced by the decoder merely holding off the decoding process until time stamp values and other system delay parameters are satisfied.

FIGS. 2-8 are described above using the data granularity of a "picture". However, other implementations use other data granularities, such as, for example, granularities larger than a picture, smaller than a picture, or simply different from a picture. Granularities larger than a picture include, for example, a group of pictures ("GOP"), or a sequence of pictures. Granularities smaller than a picture include, for example, a field, a slice, a macroblock, a partition, a pixel, and a sub-pixel. Granularities different from a picture include, for example, other data types.

Other data types include, for example, audio, system information, and programming channel guides. The principals described in this application can be extended to other data types as well. For example, audio supports scalable coding using telephone quality and CD quality transmitted with different protection levels. Other examples and implementations using these other data types need not be scalable systems.

Referring to FIG. 9A, a system 900 is shown that is designed specifically for scalable layers that are dependently encoded and decoded. That is, each higher layer is encoded based on the encoding of at least one lower layer. Similarly, each higher layer is decoded based on the successful decoding of at least one lower layer. The system 900 differs from, for example, the system 300 and the system 200 in that specific regions are identified for the source coding and decoding. This ensures that the source coding and decoding (for example, the outputs, inputs, and/or intermediate results) of lower layers is available to the higher layers.

The system 900 includes two data paths, which are a first data path 901 and a second data path 902. The two data paths 901-902 correspond to a base layer and an enhancement layer, respectively, and the enhancement layer is encoded based on the encoding of the base layer.

Accordingly, the system 900 includes a source coding delay 914 in the data path 901 and a source coding delay 915 in the data path 902. The two source coding delays 914 and 915 are aligned in time so that the results of the base layer encoding are available for the encoding of the enhancement layer. Although only a sequential encoding relationship is required, the system 900 shows a completely aligned relationship for convenience.

The data paths 901-902 also include an additional delay 921 and 922, respectively, followed by a channel coding delay 931 and 932, respectively, before transmission. On the receiving side, the data paths 901-902 include a channel decoding delay 951 and 952, respectively, and a source decoding delay 954 and 955, respectively. The two source decoding delays 954 and 955 are aligned in time so that the results of the base layer decoding are available for the decoding of the enhancement layer. Although only a sequential decoding relationship is required, the system 900 shows a completely aligned relationship for convenience.

The system 900 shows the source coding delays 914-915 being incorporated and concatenated with the additional delays 921-922, respectively. The system 900 also shows the source decoding delays 954-955 being incorporated and concatenated with the channel decoding delays 951-952, respectively. This incorporation and concatenation is for convenience, and to highlight that the systems 200 and 300, for example, are amenable to scalable implementations that have dependent encoding and/or decoding between layers. For example, in FIG. 3, (i) the additional delays 321-328 can be implemented to include a source coding delay portion at the beginning of each of the additional delays 321-328, (ii) the coding delays 331-338 can be implemented solely as channel coding delays, and (iii) the decoding delays 351-358 can be implemented to include a channel decoding delay portion initially, followed by a source decoding delay portion.

Referring to FIG. 9B, the system 900 is reconfigured as a system 910 in which the source encoding delays 914-915 and the source decoding delays 954-955 are provided in separate blocks.

Alternate implementations are also envisioned. For example, certain scalable systems use dependent encoding, but do not use dependent decoding. In such implementations, the source decoding delays of the layers (or, data paths, or transmission channels) need not be aligned in any particular manner. For example, in one implementation, the enhancement layer encodes a difference between the original picture and a reconstruction of the base layer. Accordingly, the enhancement layer encoder relies on the base layer encoding (and decoding). However, at the decoder, the enhancement layer decoder can fully decode the enhancement layer without reference to the base layer decoder. Other implementations, however, do provide dependent decoding by using, for example, common motion vectors or other syntax elements.

We now describe several specific implementations, grouped into five scenario descriptions below. Several of the implementations use multiple independent streams which are not scalable. The independent streams are intended to be independently viewable, and therefore, redundancies between the streams are not removed. Because of the redundancies, transmitting multiple independent streams for a single primary video program is inherently redundant, to some degree.

A common aspect in all of the following example scenarios is the use of OFDM for transmission channel bandwidth allocation. Multiple OFDM sub-channels can be aggregated into a smaller number of multiple virtual data (transmission) channels, each of which can be associated with, for example, one of the data paths described earlier (for example, the data paths 301-308). The multiple virtual data channels do not have to be composed of equal numbers of OFDM sub-channels. Rather, OFDM sub-channels can be grouped as desired or useful to satisfy the bandwidth needs of each multiple virtual data channel. The grouping of specific OFDM sub-channels to virtual data channels can be time varied in a known pseudo-random manner (synchronized between transmitter and receiver) to provide frequency diversity for each virtual data channel. Virtual data channels can have different FECs to meet their own specific needs. Similarly, each virtual data channel can have different temporal data interleaving to provide temporal diversity to the benefit of error correction and overall quality of service.

First Scenario:

In this first scenario, we start with a 1920×1080 image which is part of a succession of images in an HD (high definition) video stream. According to MPEG, 1920×1088 pixels are actually transmitted. The 1920×1080 image is decomposed into sixteen 480×272 low resolution images by taking every $4^{th}$ pixel (both horizontally and vertically) from the 1920×1080 image. The sampling is such that every pixel of the 16 low resolution images maps to a single unique pixel of the 1920×1080 image. Each of the sixteen 480×272 images are marked as a frame group in such a way that they can be combined later into a single 1920×1080 image representing a single point in time.

Each of the 16 low resolution images can be thought of as a different spatial shift of a subsampled high definition image (1920×1080). Successive low resolution images can be combined into to a low resolution video stream and re-grouped according to spatial shift. Thus for each of 16 spatial shifts, there will be 16 low resolution video streams.

Then, each of the 16 low resolution video streams can be transmitted according to one of 16 different communications channel parameters. Because each stream can be decoded independently of the others, the conventional notion of base layer and enhancement layers is not quite as relevant, because any stream can build on another. However, each stream can be discriminated from the other streams, from a coding standpoint, by the channel coding. In various implementations, the most robust channel coded stream is considered a base layer.

Second Scenario:

This scenario is the same as the first, except that not all of the transmitted low resolution video streams have the same resolution. For instance, in particular implementations, two of the streams are encoded at 960×544 and eight of the streams are encoded at 480×272.

Third Scenario:

In the third scenario, a standard scalable video codec is used, with each higher layer decoding dependent upon the successful decoding of a lower layer. In various described implementations in this application, the base layer of a given picture is delayed in transmission from the enhancement layers for that picture. For such dependent streams, the coding and decoding delays can be provided as shown, for example, in FIGS. 9A-9B.

Fourth Scenario:

In the fourth scenario, a hybrid video codec is used, consisting of a low resolution base layer such as 480×272 compressed using MPEG-2, H.264, or HEVC, for example. Enhancement layers are compressed and coded using a wavelet transform. The enhancement layers capture differentials from the base layer minus the original, as with the fifth scenario described below.

Fifth Scenario:

In the fifth scenario, a hybrid video codec is used, consisting of a low resolution base layer such as 480×272 compressed using MPEG-2, H.264, or HEVC, for example. Enhancement layers are compressed and coded using MEPG-2, H.264, or HEVC on the residue after subtraction of the base layer image from the original high resolution image.

Figure 10:
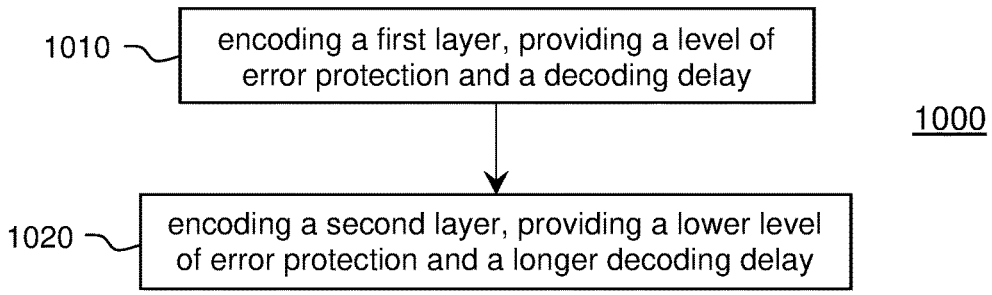
FIG. 10 provides a flow diagram depicting an implementation of a process for encoding layers.

Referring to FIG. 10, a process 1000 is shown for encoding multiple layers of a picture. The process 1000 includes encoding a first layer of the picture, providing a level of error protection and a decoding delay (1010). The process 1000 also includes encoding a second layer of the picture, providing a lower level of error protection and a longer decoding delay (1020).

The level of error protection can be determined in various ways. For example, if coding parameters are known, then the level of error protection can be determined, at least in a relative sense from the coding parameters. That is, certain codes, by definition, provide more or less error protection than other codes. As another example, bit error rate, burst error length, and other transmission channel characteristics, can be measured to determine the level of error protection. The same is true of decoding delay, as of error protection. That is, the decoding delay can be determined, for example, from coding parameters, or from empirical measurements.

Note also that certain implementations provide a certain level of forward error correction (FEC). The level of FEC refers to the level of error protection provided by a particular FEC code. Additionally, various implementations provide a certain interleaving level of error protection. The level of error protection provided by an interleaving scheme can vary significantly, depending on other parameters, such as, for example, signal energy. The level of error protection provided by an interleaving scheme also varies depending on what type of errors are expected or encountered. In many implementations, however, the level of error protection provided by an interleaving scheme, against at least, for example, burst errors, is typically proportional to the interleave length and the size of the interleave block. Longer interleave lengths, and shorter interleave block sizes, typically provide higher levels of error protection in these implementations. Interleaving schemes vary, but one simple example involves interleaving two streams of data. In a first interleaving scheme, 100 bits from each of two streams are alternately inserted into a transmission stream. In this first interleaving scheme, the interleave length is 200 bits (2×100), and the interleave block size is 100 bits. In a second interleaving scheme, 50 bits from each of four streams are alternately inserted into a transmission stream. In this second interleaving scheme, the interleave length is still 200 bits (4×50), but the interleave block size is now only 50 bits. The second interleaving scheme is generally considered to provide a higher level of error protection than the first interleaving scheme, at least against burst errors, with other parameters held constant. The interleaving level of error protection, as well as the level of FEC, can be calculated for various implementations, or can be measured directly for certain implementations.

Quality of a picture can also be determined in various ways. For example, one can measure the difference (pixel by pixel) between the source video and the decoded output video and determine a measure of quality or fidelity, such as, for example, mean-squared-error, or a SNR. There are also more subjective quality measures, such as, for example, observing and evaluating visual compression artifacts. Less subjective measures also include spatial and temporal resolutions, such as, for example, when the decoded output spatial resolution is less than the source resolution and is therefore considered to have poorer quality.

Although indicated as a sequence of operations in FIG. 10, the operations 1010 and 1020 can be performed in reverse order or in parallel in various implementations. The process 1000 is performed, in at least one implementation, by one or more of the systems 100, 300, 900, or 910. In various different implementations, the operations 1010 and 1020 are performed by the source and channel encoders of FIG. 1, or by the source and channel encoders of the data paths 301-308 and 901-902.

Figure 11:
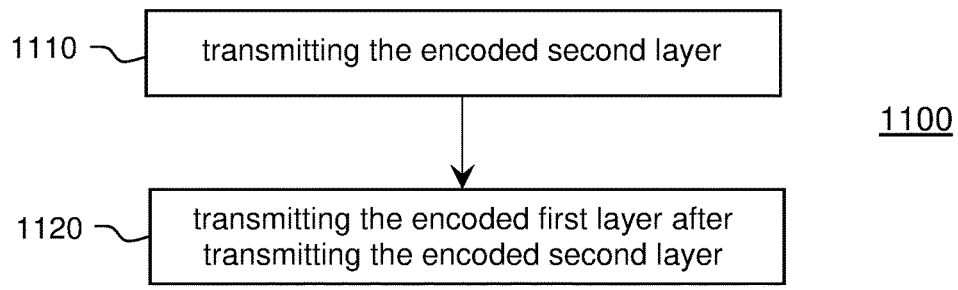
FIG. 11 provides a flow diagram depicting an implementation of a process for transmitting encoded layers.

Referring to FIG. 11, a process 1100 is shown for encoding multiple layers of a picture. The process 1100 is performed, in at least one implementation, in conjunction with the process 1000. The process 1100 includes transmitting the encoded second layer of the picture (see the operation 1020) (1110). The process 1100 also includes transmitting the encoded first layer of the picture (see the operation 1010) after transmitting the encoded second layer of the picture (1120). The process 1100 is performed, in at least one implementation, by one or more of the systems 100, 300, 900, or 910. In various different implementations, the operations 1110 and 1120 are performed by the modulators of FIG. 1, or during the transmission periods of the data paths 301-308 and 901-902.

Figure 12:
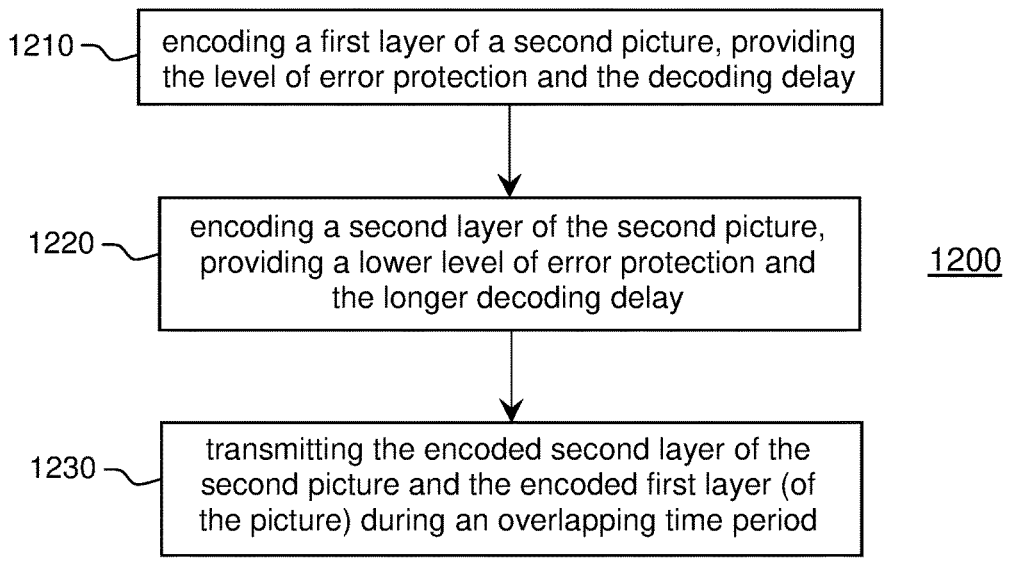
FIG. 12 provides a flow diagram depicting an implementation of a process for encoding and transmitting layers.

Referring to FIG. 12, a process 1200 is shown for encoding multiple layers of a picture. The process 1200 is performed, in at least one implementation, in conjunction with the process 1000. The process 1200 includes encoding a first layer of a second picture, providing the level of error protection and the decoding delay (see the operation 1010) (1210). The process 1200 also includes encoding a second layer of the second picture, providing the lower level of error protection and the longer decoding delay (see the operation 1020) (1220). The process 1200 also includes transmitting the encoded second layer of the second picture and the encoded first layer of the picture (see the operation 1010) during an overlapping time period (1230). Although indicated as a sequence of operations in FIG. 12, the operation 1210 can be performed before, after, or in parallel with either of the operations 1220 and 1230 in various implementations. The process 1200 is performed, in at least one implementation, by one or more of the systems 100, 300, 900, or 910. In various different implementations, the operations 1210-1230 are performed (i) by the source encoders, the channel encoders, and the modulators of FIG. 1, or (ii) by the source and channel encoders, and during the transmission periods, of the data paths 301-308 and 901-902.

Figure 13:
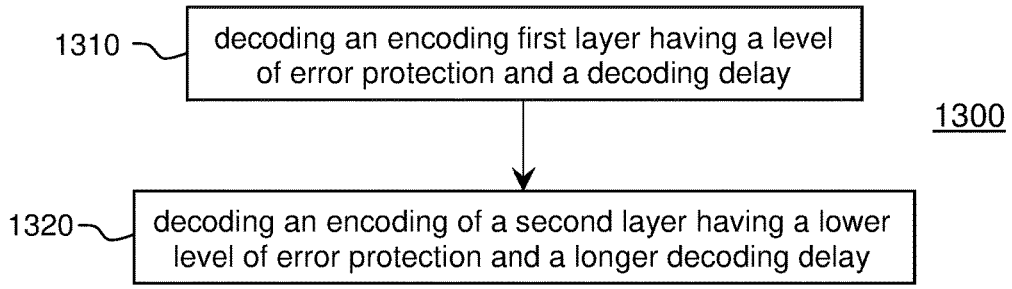
FIG. 13 provides a flow diagram depicting an implementation of a process for decoding layers.

Referring to FIG. 13, a process 1300 is shown for decoding multiple layers of a picture. The process 1300 includes decoding an encoded first layer of a picture having a level of error protection and a decoding delay (1310). The process 1300 also includes decoding an encoding of a second layer of the picture having a lower level of error protection and a longer decoding delay (1320). Although indicated as a sequence of operations in FIG. 13, the operations 1310 and 1320 can be performed in reverse order or in parallel in various implementations. The process 1300 is performed, in at least one implementation, by one or more of the systems 100, 300, 900, or 910. In various different implementations, the operations 1310 and 1320 are performed by the source and channel decoders of FIG. 1, or by the source and channel decoders of the data paths 301-308 and 901-902.

Figure 14:
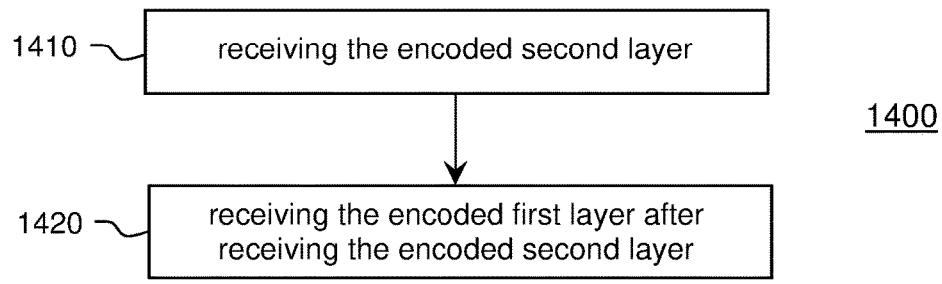
FIG. 14 provides a flow diagram depicting an implementation of a process for receiving encoded layers.

Referring to FIG. 14, a process 1400 is shown for decoding multiple layers of a picture. The process 1400 is performed, in at least one implementation, in conjunction with the process 1300. The process 1400 includes receiving the encoded second layer of the picture (see the operation 1320) (1410). The process 1400 also includes receiving the encoded first layer of the picture (see the operation 1310) after receiving the encoded second layer of the picture (1420). The process 1400 is performed, in at least one implementation, by one or more of the systems 100, 300, 900, or 910. In various different implementations, the operations 1410 and 1420 are performed by the modulators of FIG. 1, or during the transmission periods of the data paths 301-308 and 901-902.

Figure 15:
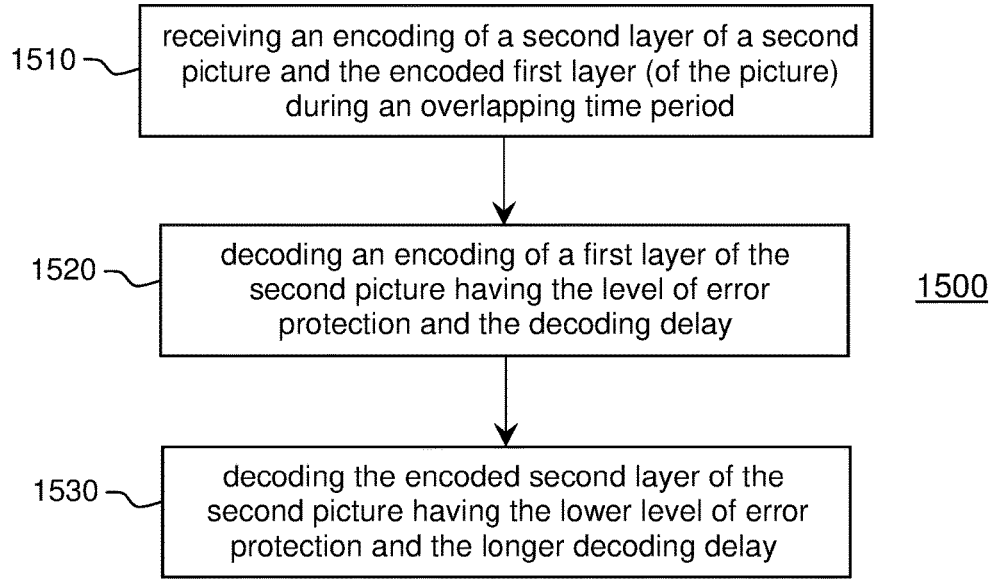
FIG. 15 provides a flow diagram depicting an implementation of a process for receiving and decoding encoded layers.

Referring to FIG. 15, a process 1500 is shown for decoding multiple layers of a picture. The process 1500 is performed, in at least one implementation, in conjunction with the process 1300. The process 1500 includes receiving an encoding of a second layer of a second picture having the lower level of error protection and the longer decoding delay (see the operation 1320) and the encoded first layer of the picture (see the operation 1310) during an overlapping time period (1510). The process 1500 also includes decoding an encoding of a first layer of the second picture having the level of error protection and the decoding delay (see the operation 1310) (1520). The process 1500 also includes decoding the encoded second layer of the second picture (1530). Although indicated as a sequence of operations in FIG. 15, the operation 1520 can be performed before, after, or in parallel with either of the operations 1510 and 1530 in various implementations. The process 1500 is performed, in at least one implementation, by one or more of the systems 100, 300, 900, or 910. In various different implementations, the operations 1510-1530 are performed (i) by the source decoders, the channel decoders, and the modulators of FIG. 1, or (ii) by the source and channel decoders, and during the transmission periods, of the data paths 301-308 and 901-902.

In various implementations, one or more source codes, one or more channel codes, and/or a modulation technique are selected for each data path (for example, the data path 301). Further, it is clear that the source code(s), the channel code(s), and the modulation technique that is selected can be different in one or all aspects for every data path. Additionally, it should be clear that this process of selection has the effect of providing a specific level of error protection, a specific length of encoding delay, and a specific length of decoding delay. These factors of error protection and coding delay determine all or part of (i) the quality of the decoded pictures in the implementation, (ii) the robustness of the implementation against noise, and in particular cliff effect, as well as (iii) the suitability of the system for providing fast "channel zaps". Additionally, the selection of the source code(s), the channel code(s), and the modulation technique for each data path also determines whether an implementation will have a feature of providing increasingly good quality of pictures after a "channel zap".

The selection of source code(s), the channel code(s), and the modulation technique for a given data path can include, for example, a selection of a particular source code, a selection of a particular Forward Error Correcting ("FEC") channel code, a selection of a particular deinterleaving length and deinterleaving pattern, and a selection of a particular number of bits per symbol in a modulation technique.

Referring to FIG. 16, a video transmission system or apparatus 1600 is shown, to which the features and principles described above may be applied. The video transmission system or apparatus 1600 may be, for example, a head-end or transmission system for transmitting a signal using any of a variety of media, such as, for example, satellite, cable, telephone-line, or terrestrial broadcast. The video transmission system or apparatus 1600 also, or alternatively, may be used, for example, to provide a signal for storage. The transmission may be provided over the Internet or some other network. The video transmission system or apparatus 1600 is capable of generating and delivering, for example, video content and other content such as, for example, metadata. It should also be clear that the blocks of FIG. 16 provide a flow diagram of a video transmission process, in addition to providing a block diagram of a video transmission system or apparatus.

The video transmission system or apparatus 1600 receives input video from a processor 1601. In one implementation, the processor 1601 simply provides video images, such as images from a program, to the video transmission system or apparatus 1600. However, in another implementation, the processor 1601 alternatively, or additionally, provides content from other sources to the video transmission system or apparatus 1600. The processor 1601 may also provide metadata to the video transmission system or apparatus 1600, in which the metadata relates, for example, to one or more of the input images, and may include, for example, a description of encoding methods used to encode the data.

The video transmission system or apparatus 1600 includes an encoder 1602 and a transmitter 1604 capable of transmitting the encoded signal. The encoder 1602 receives video information from the processor 1601. The video information may include, for example, video images, and/or other content. The encoder 1602 generates an encoded signal(s) based on the video and/or other information. The encoder 1602 is, in various implementations, a source encoder, a channel encoder, or a combination of a source encoder and a channel encoder. In one implementation, the encoder 1602 includes the source encoder 1 112 and the channel encoder 1 122 of FIG. 1. In various implementations, the encoder 1602 is, for example, an AVC encoder.

The encoder 1602 may include sub-modules, including for example an assembly unit for receiving and assembling various pieces of information into a structured format for storage or transmission. The various pieces of information may include, for example, encoded or unencoded video, other content, metadata or information, and various elements such as, for example, motion vectors, coding mode indicators, and syntax elements. In some implementations, the encoder 1602 includes the processor 1601 and therefore performs the operations of the processor 1601.

The transmitter 1604 receives the encoded signal(s) from the encoder 1602 and transmits the encoded signal(s) in one or more output signals. The transmitter 1604 may be, for example, adapted to transmit a program signal having one or more bitstreams representing encoded pictures and/or information related thereto. Typical transmitters perform functions such as, for example, one or more of providing error-correction coding (which may alternatively, or additionally, be performed in the encoder 1602), interleaving the data in the signal (which may alternatively, or additionally, be performed in the encoder 1602), randomizing the energy in the signal, and modulating the signal onto one or more carriers using a modulator 1606. The transmitter 1604 may include, or interface with, an antenna (not shown). Further, implementations of the transmitter 1604 may be limited to the modulator 1606.

The video transmission system or apparatus 1600 is also communicatively coupled to a storage unit 1608. In one implementation, the storage unit 1608 is coupled to the encoder 1602, and the storage unit 1608 stores an encoded bitstream from the encoder 1602 and, optionally, provides the stored bitstream to the transmitter 1604. In another implementation, the storage unit 1608 is coupled to the transmitter 1604, and stores a bitstream from the transmitter 1604. The bitstream from the transmitter 1604 may include, for example, one or more encoded bitstreams that have been further processed by the transmitter 1604. The storage unit 1608 is, in different implementations, one or more of a standard DVD, a Blu-Ray disc, a hard drive, or some other storage device.

In various implementations, the video transmission system or apparatus 1600 performs one or more of the processes 1000-1500. For example, the encoder 1602 performs the process 1000, the transmitter 1604 performs the process 1100, and/or the encoder 1602 together with the transmitter 1604 performs the process 1200.

Referring now to FIG. 17, a video receiving system or apparatus 1700 is shown to which the features and principles described above may be applied. The video receiving system or apparatus 1700 may be configured to receive signals over a variety of media, such as, for example, satellite, cable, telephone-line, or terrestrial broadcast. The signals may be received over the Internet or some other network. It should also be clear that the blocks of FIG. 17 provide a flow diagram of a video receiving process, in addition to providing a block diagram of a video receiving system or apparatus.

The video receiving system or apparatus 1700 may be, for example, a cell-phone, a computer, a tablet, a router, a gateway, a set-top box, a television, or other device that receives encoded video and provides, for example, decoded video signal for display (display to a user, for example), for processing, or for storage. Thus, the video receiving system or apparatus 1700 may provide its output to, for example, a screen of a television, a screen of a cell phone, a screen of a tablet, a computer monitor, a computer (for storage, processing, or display), or some other storage, processing, or display device.

The video receiving system or apparatus 1700 is capable of receiving and processing video information. The video information may include, for example, video images, other content, and/or metadata. The video receiving system or apparatus 1700 includes a receiver 1702 for receiving an encoded signal, such as, for example, the signals described in the implementations of this application. The receiver 1702 may receive, for example, (i) a signal providing encoded layers for a sequence of pictures in a program, (ii) a signal output from the video transmission system 1600 (for example, from the storage unit 1608 or the transmitter 1604) of FIG. 16, (iii) a signal transmitted during any of the transmission periods 241-248, 341-348, and/or (iv) the signal provided to the channel decoding delays 951-952.

The receiver 1702 may be, for example, adapted to receive a program signal having a plurality of bitstreams representing encoded pictures (for example, video pictures or depth pictures). Typical receivers perform functions such as, for example, one or more of receiving a modulated and encoded data signal, demodulating the data signal from one or more carriers using a demodulator 1704, de-randomizing the energy in the signal, de-interleaving the data in the signal (which may alternatively, or additionally, be performed in a decoder), and error-correction decoding the signal (which may alternatively, or additionally, be performed in a decoder). The receiver 1702 may include, or interface with, an antenna (not shown). Implementations of the receiver 1702 may be limited to the demodulator 1704.

The video receiving system or apparatus 1700 includes a decoder 1706. The decoder 1706 is, in various implementations, a source decoder, a channel decoder, or a combination of a source decoder and a channel decoder. In one implementation, the decoder 1706 includes the channel decoder 155 and the source decoder 160 of FIG. 1.

The receiver 1702 provides a received signal to the decoder 1706. The signal provided to the decoder 1706 by the receiver 1702 may include one or more encoded bitstreams. The decoder 1706 outputs a decoded signal, such as, for example, decoded video signals including video information, other content, or metadata. The decoder 1706 may be, for example, an AVC decoder.

The video receiving system or apparatus 1700 is also communicatively coupled to a storage unit 1707. In one implementation, the storage unit 1707 is coupled to the receiver 1702, and the receiver 1702 accesses a bitstream from the storage unit 1707 and/or stores a received bitstream to the storage unit 1707. In another implementation, the storage unit 1707 is coupled to the decoder 1706, and the decoder 1706 accesses a bitstream from the storage unit 1707 and/or stores a decoded bitstream to the storage unit 1707. The bitstream accessed from the storage unit 1707 includes, in different implementations, one or more encoded bitstreams. The storage unit 1707 is, in different implementations, one or more of a standard DVD, a Blu-Ray disc, a hard drive, or some other storage device.

The output video from the decoder 1706 is provided, in one implementation, to a processor 1708. The processor 1708 is, in one implementation, a processor configured for presenting decoded digital pictures. In some implementations, the decoder 1706 includes the processor 1708 and therefore performs the operations of the processor 1708. In other implementations, the processor 1708 is part of a downstream device such as, for example, a set-top box or a television.

In various implementations, the video receiving system or apparatus 1700 performs one or more of the processes 1300-1500. For example, the decoder 1706 performs the process 1300, the receiver 1702 performs the process 1400, and the decoder 1706 together with the receiver 1702 performs the process 1500.

Various implementations provide signals. Examples includes (i) the signals provided by the modulators of FIG. 1, (ii) the signals transmitted during the transmission periods 241-248 and 341-348, (iii) the signals provided between the channel coding delays 931-932 and the channel decoding delays 951-952, (iv) the signals transmitted by the operations 1110, 1120, and 1230, and (v) the signals provided by the transmitter 1604. A variety of examples are discussed below, without limitation:

Various signals or signal structures, whether in transmission or stored on a medium, can have the form, for example, of: (i) a first layer section for a picture, the first layer section including an encoded first layer of the picture that provides a first level of error protection for the first layer of the picture and that has a first decoding delay, and (ii) a second layer section for the picture, the second layer section including an encoded second layer of the picture that provides a second level of error protection for the second layer of the picture and that has a second decoding delay, wherein the second level of error protection is lower than the first level of error protection, and the second decoding delay is longer than the first decoding delay.

An additional implementation of a signal can include, for example, that the second layer section for the picture occurs earlier in time than the first layer section for the picture.

An additional implementation of a signal can include, for example, (i) a first layer section for a second picture, the first layer section for the second picture including an encoded first layer of the second picture that provides the first level of error protection and that has the first decoding delay, and (ii) a second layer section for the second picture, the second layer section for the second picture including an encoded second layer of the second picture that provides the second level of error protection and that has the second decoding delay, wherein the second layer section for the second picture is multiplexed during an overlapping time period with the first layer section for the picture.

This application provides multiple figures, including the block diagrams of FIGS. 1-9B and 16-17, and the flow diagrams of FIGS. 10-15. Each of these figures provides disclosure for a variety of implementations.

For example, the block diagrams certainly describe an interconnection of functional blocks of an apparatus or system. However, it should also be clear that the block diagrams provide a description of a process flow. As an example, FIG. 1 also presents a flow diagram for performing the functions of the blocks of FIG. 1. For example, the block for the source 1 102 also represents the operation of providing content, and the block for source encoder 1 112 also represents the operation of performing source encoding on the content provided by the source 1 102. Other blocks of FIG. 1 are similarly interpreted in describing this flow process. Further, FIGS. 2-9B and 16-17 can also be interpreted in a similar fashion to describe respective flow processes.

For example, the flow diagrams certainly describe a flow process. However, it should also be clear that the flow diagrams provide an interconnection between functional blocks of a system or apparatus for performing the flow process. As an example, FIG. 10 also presents a block diagram for performing the functions of the process 1000. For example, reference element 1010 also represents a block for performing the function of encoding a first layer to provide a level of error protection and a decoding delay. Other blocks of FIG. 10 are similarly interpreted in describing this system/apparatus. Further, FIGS. 11-15 can also be interpreted in a similar fashion to describe respective systems or apparatuses.

We have thus provided a number of implementations. Various implementations provide and/or receive video, audio, or other content. Various other implementations also provide such content in a manner that (i) improves quality of the reconstructed content, (ii) reduces likelihood of encountering the cliff effect, (iii) shortens delay time until a picture is available after a channel zap, and/or (iv) provides for progressively (and typically monotonically) increasing quality of content that is provided to a user for consumption after a channel zap.

Several of the implementations and features described in this application may be used in the context of the AVC Standard, and/or AVC with the MVC (Multiview Video Coding) extension (Annex H), and/or AVC with the SVC (Scalable Video Coding) extension (Annex G). Additionally, these implementations and features may be used in the context of another standard (existing or future), or in a context that does not involve a standard. Note that AVC refers to the existing International Organization for Standardization/International Electrotechnical Commission ("ISO/IEC") Moving Picture Experts Group-4 ("MPEG-4") Part 10 Advanced Video Coding ("AVC") standard/International Telecommunication Union, Telecommunication Sector ("ITU-T") H.264 Recommendation (variously referred to throughout this document as the "H.264/MPEG-4 AVC Standard" or variations thereof, such as the "AVC standard", the "H.264 standard", or simply "AVC" or "H.264").

Note that decoded layers are typically combined with other layers, in a scalable manner. However, can also (or alternatively) be considered as versions and be available for display without combining with any other layer. Note also that layers are frequently coded in a dependent manner, such as, for example, using SVC. However, layers can also be coded independently.

It should be noted, however, that variations of the described implementations, as well as additional applications, are contemplated and are considered to be within our disclosure. Additionally, features and aspects of described implementations may be adapted for other implementations.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, memory), storing the information, processing the information, transmitting the information, moving the information, copying the information, erasing the information, calculating the information, determining the information, predicting the information, or estimating the information.

This application refers to "encoders" and "decoders" in a variety of implementations. It should be clear that an encoder can include, for example, one or more (or no) source encoders and/or one or more (or no) channel encoders, as well as one or more (or no) modulators. Similarly, it should be clear that a decoder can include, for example, one or more (or no) modulators as well as one or more (or no) channel encoders and/or one or more (or no) source encoders.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in a processor, such as, for example, a post-processor or a pre-processor. The processors discussed in this application do, in various implementations, include multiple processors (sub-processors) that are collectively configured to perform, for example, a process, a function, or an operation. For example, the processor 1601, and the processor 1708, as well as other processing components such as, for example, the various source and channel encoders, are, in various implementations, composed of multiple sub-processors that are collectively configured to perform the operations of that component.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants ("PDAs"), and other devices that facilitate communication of information between end-users.

Implementations of the various processes and features described herein may be embodied in a variety of different equipment or applications. Examples of such equipment include an encoder, a decoder, a post-processor, a pre-processor, a video coder, a video decoder, a video codec, a web server, a television, a set-top box, a router, a gateway, a modem, a laptop, a personal computer, a tablet, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading syntax, or to carry as data the actual syntax-values generated using the syntax rules. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
receiving an encoding of a first layer of a picture and an encoding of a second layer of the picture, the encoding of the second layer of the picture arriving before the encoding of the first layer of the picture;
decoding the encoding of the first layer of a picture, the encoding of the first layer having a first level of error protection and a first decoding delay; and
decoding the encoding of the second layer of the picture, the encoding of the second layer having a second level of error protection and a second decoding delay,
wherein the second level of error protection is lower than the first level of error protection, and the second decoding delay is longer than the first decoding delay.

2. The method of claim 1 further comprising:
receiving the encoded second layer; and
receiving the encoded first layer after receiving the encoded second layer.

3. The method of claim 1 further comprising:
decoding an encoding of a first layer of a second picture, the encoding of the first layer of the second picture having the first level of error protection and the first decoding delay;
decoding an encoding of a second layer of the second picture, the encoding of the second layer of the second picture having the second level of error protection and the second decoding delay;
receiving the encoded second layer of the second picture; and
receiving the encoded first layer of the picture during an overlapping time period as receiving the encoded second layer of the second picture.

4. The method of claim 1 wherein a combination of the first layer of the picture and the second layer of the picture has a higher quality than the first layer of the picture.

5. The method of claim 4 wherein the higher quality is due, at least in part, to a higher spatial resolution or a higher temporal resolution.

6. The method of claim 1 wherein the encoding of the second layer of the picture (i) has a lower FEC level than the encoding of the first layer of the picture and (ii) has a higher interleaving level than the encoding of the first layer of the picture.

7. The method of claim 1 further comprising decoding an encoding of a third layer of the picture using a third level of error protection, the encoded third layer of the picture having a third decoding delay,
wherein the third level of error protection is lower than the second level of error protection, and the third decoding delay is longer than the second decoding delay.

8. The method of claim 7 wherein a combination of the first layer of the picture, the second layer of the picture, and the third layer of the picture has a higher quality than a combination of the first layer of the picture and the second layer of the picture.

9. The method of claim 7 further comprising:
receiving the encoded third layer of the picture;
receiving the encoded second layer of the picture after receiving the encoded third layer of the picture; and
receiving the encoded first layer of the picture after receiving the encoded second layer of the picture.

10. The method of claim 1 wherein the picture is from a first programming channel, and the method further comprises:
receiving a request for a change to a second programming channel;
decoding an encoding of a first layer of a picture from the second programming channel; and
displaying the decoded first layer of the picture from the second programming channel.

11. The method of claim 10 further comprising:
decoding an encoding of a first layer of a subsequent picture from the second programming channel, the subsequent picture occurring after the picture from the second programming channel;
decoding an encoding of a second layer of the subsequent picture from the second programming channel; and displaying a combination of the decoded first layer of the subsequent picture and the decoded second layer of the subsequent picture.

12. The method of claim 11 further comprising:
decoding an encoding of a first layer of a further picture from the second programming channel, the further picture occurring after the subsequent picture from the second programming channel;
decoding an encoding of a second layer of the further picture from the second programming channel;
decoding an encoding of a third layer of the further picture from the second programming channel; and
displaying a combination of the decoded first layer of the further picture, the decoded second layer of the further picture, and the decoded third layer of the further picture.

13. A decoder configured for performing the following:
receiving an encoding of a first layer of a picture and an encoding of a second layer of the picture, the second layer of the picture arriving before the first layer of the picture;
decoding the encoding of the first layer of a picture, the encoding of the first layer having a first level of error protection and a first decoding delay; and
decoding the encoding of the second layer of the picture, the encoding of the second layer having a second level of error protection and a second decoding delay,
wherein the second level of error protection is lower than the first level of error protection, and the second decoding delay is longer than the first decoding delay.

14. The decoder of claim 13 wherein the decoder comprises:
a source decoder; and
a channel decoder.

15. An apparatus comprising one or more processors collectively configured for performing:
decoding an encoding of a first layer of a picture, the encoding of the first layer having a first level of error protection and a first decoding delay;
decoding an encoding of a second layer of the picture, the encoding of the second layer having a second level of error protection and a second decoding delay; and
transmitting the encoding of the first layer of the picture and the encoding of the second layer of the picture, the encoding of the second layer of the picture being transmitted before the encoding of the first layer of the picture,
wherein the second level of error protection is lower than the first level of error protection, and the second decoding delay is longer than the first decoding delay.

16. An apparatus comprising:
means for decoding an encoding of a first layer of a picture, the encoding of the first layer having a first level of error protection and a first decoding delay;
means for decoding an encoding of a second layer of the picture, the encoding of the second layer having a second level of error protection and a second decoding delay; and
means for transmitting the encoding of the first layer of the picture and the encoding of the second layer of the picture, the encoding of the second layer of the picture being transmitted before the encoding of the first layer of the picture,
wherein the second level of error protection is lower than the first level of error protection, and the second decoding delay is longer than the first decoding delay.

17. A non-transitory processor readable medium having stored thereon instructions for causing one or more processors to collectively perform:
receiving an encoding of a first layer of a picture and an encoding of a second layer of the picture, the encoding of the second layer of the picture arriving before the encoding of the first layer of the picture;
decoding the encoding of the first layer of a picture, the encoding of the first layer having a first level of error protection and a first decoding delay; and
decoding the encoding of the second layer of the picture, the encoding of the second layer having a second level of error protection and a second decoding delay,
wherein the second level of error protection is lower than the first level of error protection, and the second decoding delay is longer than the first decoding delay.

18. The method of claim 11, wherein decoding the encoding of the first layer of the subsequent picture is performed without having decoded a second layer of the picture of the second programming channel.

* * * * *